United States Patent
Hudalla et al.

(10) Patent No.: US 11,565,197 B2
(45) Date of Patent: Jan. 31, 2023

(54) METHODOLOGY FOR SCALING METHODS BETWEEN SUPERCRITICAL FLUID CHROMATOGRAPHY SYSTEMS

(71) Applicant: Waters Technologies Corporation, Milford, MA (US)

(72) Inventors: Christopher J. Hudalla, Milford, MA (US); Abhijit Tarafder, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 785 days.

(21) Appl. No.: 14/898,014

(22) PCT Filed: Jun. 12, 2014

(86) PCT No.: PCT/US2014/042076
§ 371 (c)(1),
(2) Date: Dec. 11, 2015

(87) PCT Pub. No.: WO2014/201222
PCT Pub. Date: Dec. 18, 2014

(65) Prior Publication Data
US 2016/0136544 A1    May 19, 2016

Related U.S. Application Data

(60) Provisional application No. 61/835,556, filed on Jun. 15, 2013, provisional application No. 61/835,055, filed on Jun. 14, 2013.

(51) Int. Cl.
*B01D 15/40* (2006.01)
*B01D 15/16* (2006.01)
(Continued)

(52) U.S. Cl.
CPC .............. *B01D 15/40* (2013.01); *B01D 15/16* (2013.01); *B01D 15/163* (2013.01); *B01J 3/02* (2013.01);
(Continued)

(58) Field of Classification Search
None
See application file for complete search history.

(56) References Cited

U.S. PATENT DOCUMENTS 4,734,451 A   3/1988   Smith
4,984,602 A   1/1991   Saito et al.
(Continued)

FOREIGN PATENT DOCUMENTS

EP    0309380 A2      3/1989
WO    2013167193 A1  11/2013

OTHER PUBLICATIONS

HPLC Separation Fundamentals. Agilent Technologies. Accessed on Jan. 9, 2018 from https://www.agilent.com/cs/library/eseminars/Public/HPLC%20Separation%20Fundamentals_020811.pdf. Publication date Feb. 8, 2011.*

(Continued)

*Primary Examiner* — Kara M Peo
(74) *Attorney, Agent, or Firm* — Deborah M. Vernon; Womble Bond Dickinson (US) LLP

(57) ABSTRACT

A methodology scales supercritical fluid chromatography (SFC) and/or carbon dioxide based chromatography methods between different system and/or column configurations. The methodology includes measuring an average mobile phase density during a first separation utilizing CO2 as a mobile phase component and substantially duplicating the average density profile for a second separation. Substantial duplication of the average mobile phase density (e.g., within about 10%, 5%, 2.5%, 1%, 0.5%, 0.1 %, 0.05%) results in (Continued)

chromatography for both system and/or column configurations having similar selectivity and retention factors. Average mobile phase density may be, either measured directly, calculated, or approximated using average pressure or density measurements. The average pressure profile may be used as a close approximation to duplicate average density profiles between separations.

6 Claims, 18 Drawing Sheets

(51) Int. Cl.
    *G01N 30/86*     (2006.01)
    *G01N 30/32*     (2006.01)
    *B01J 3/02*     (2006.01)

(52) U.S. Cl.
    CPC ......... *G01N 30/32* (2013.01); *G01N 30/8658* (2013.01); *G01N 2030/326* (2013.01)

(56) References Cited

U.S. PATENT DOCUMENTS

| | | |
|---|---|---|
| 5,133,859 A | 7/1992 | Frank et al. |
| 5,305,232 A | 4/1994 | Chimowitz et al. |
| 5,422,007 A | 6/1995 | Nicoud et al. |
| 5,476,000 A | 12/1995 | Henderson et al. |
| 5,545,252 A | 8/1996 | Hinshaw et al. |
| 5,958,246 A | 9/1999 | Tipler et al. |
| 3,419,936 A1 | 4/2013 | Berger et al. |
| 2003/0165628 A1 | 9/2003 | Simmons et al. |
| 2005/0061745 A1 | 3/2005 | Xie et al. |
| 2008/0166817 A1 | 7/2008 | Gillespie et al. |
| 2009/0050568 A1 | 2/2009 | Fogelman et al. |
| 2010/0102008 A1 | 4/2010 | Hedberg |
| 2011/0306146 A1 | 12/2011 | Sidhu et al. |
| 2013/0048095 A1 | 2/2013 | Wikfors et al. |
| 2015/0129474 A1 | 5/2015 | Bouvier et al. |
| 2015/0129494 A1 | 5/2015 | Joudrey et al. |
| 2016/0136544 A1 | 5/2016 | Hudalla |

OTHER PUBLICATIONS

International Search Report of the International Searching Authority for PCT/US2014/042076, dated Oct. 7, 2014.
International Preliminary Report on Patentability of the International Bureau of WIPO and Written Opinion of the International Searching Authority, dated Dec. 15, 2015.

* cited by examiner

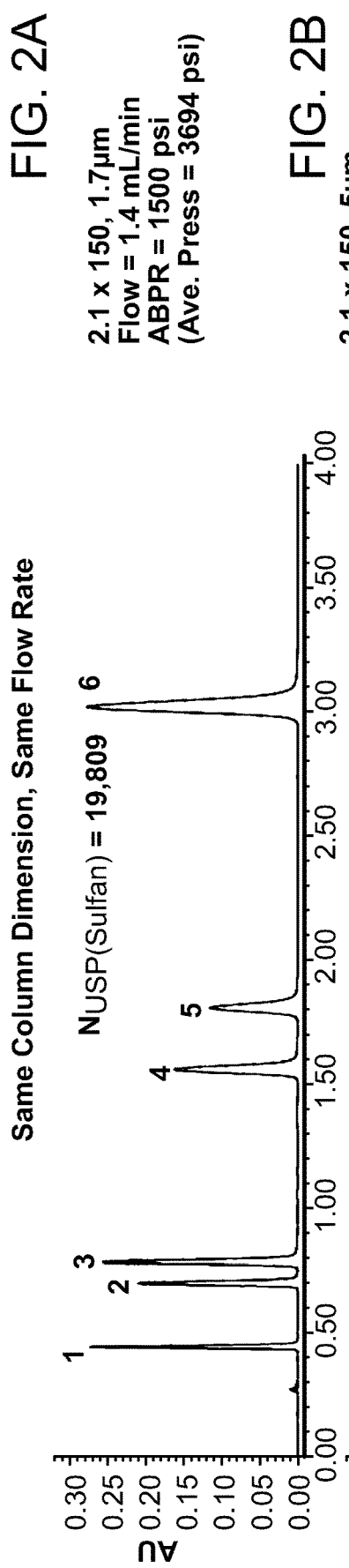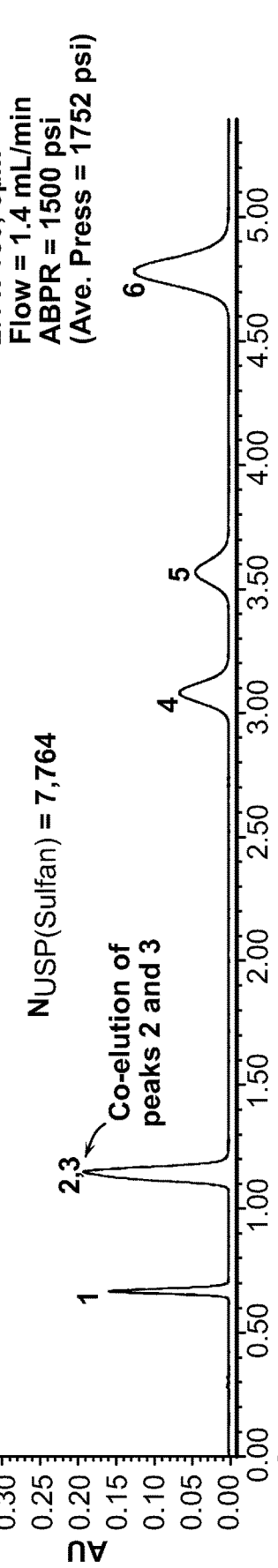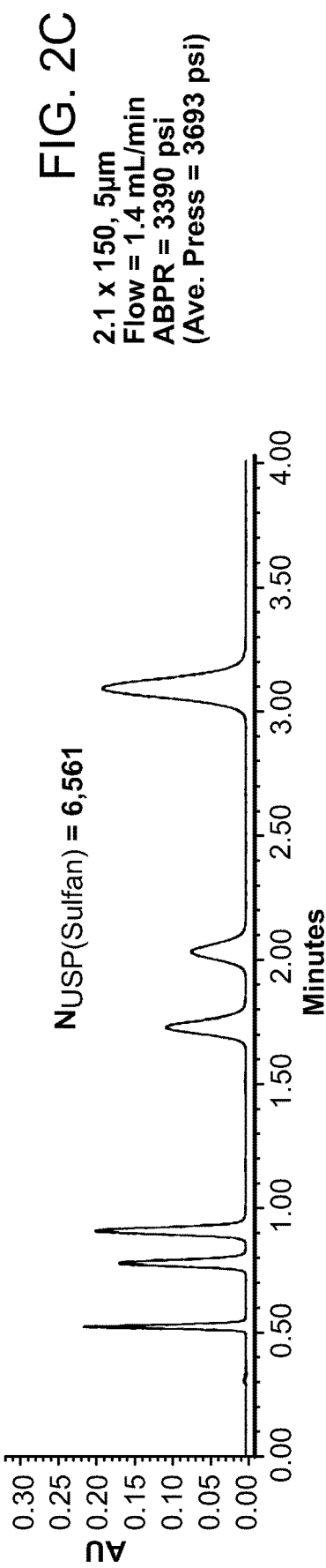

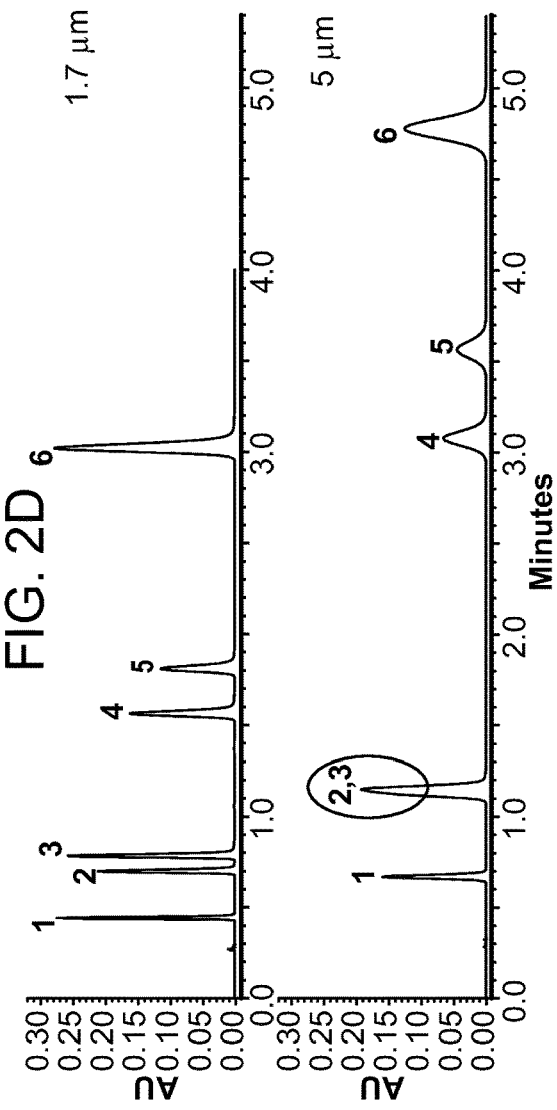
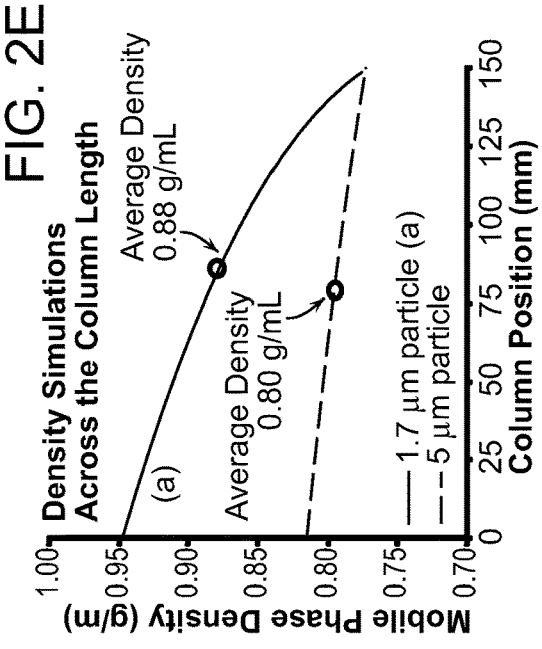
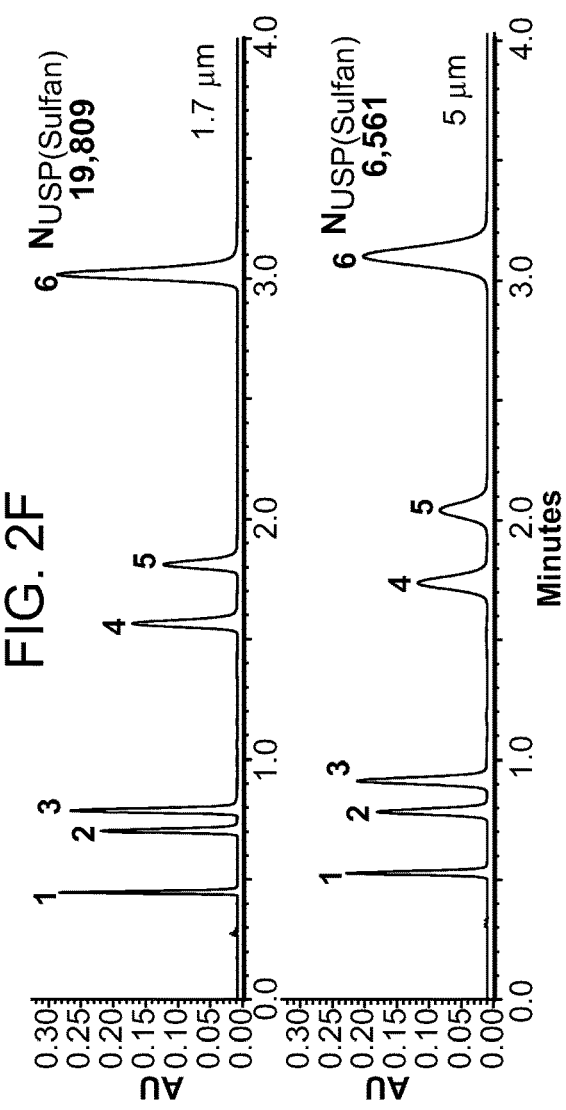

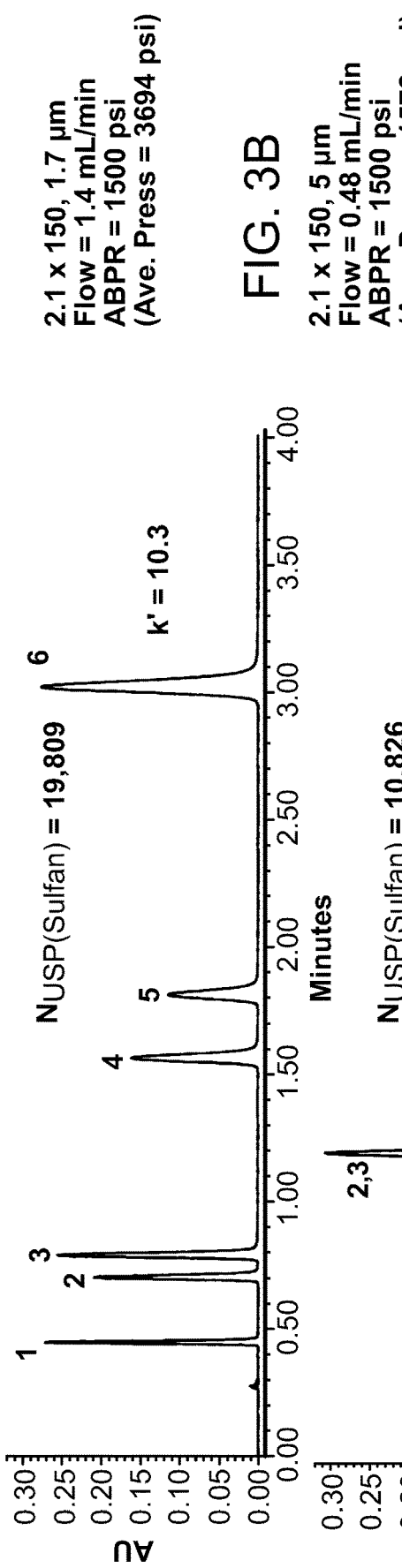
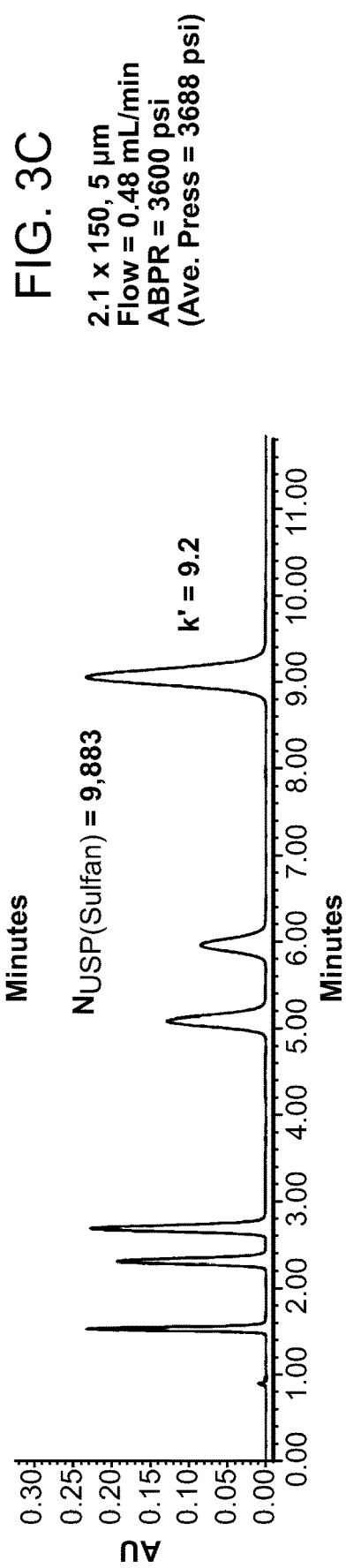
FIG. 3A — 2.1 x 150, 1.7 µm, Flow = 1.4 mL/min, ABPR = 1500 psi (Ave. Press = 3694 psi)
FIG. 3B — 2.1 x 150, 5 µm, Flow = 0.48 mL/min, ABPR = 1500 psi (Ave. Press = 1572 psi)
FIG. 3C — 2.1 x 150, 5 µm, Flow = 0.48 mL/min, ABPR = 3600 psi (Ave. Press = 3688 psi)

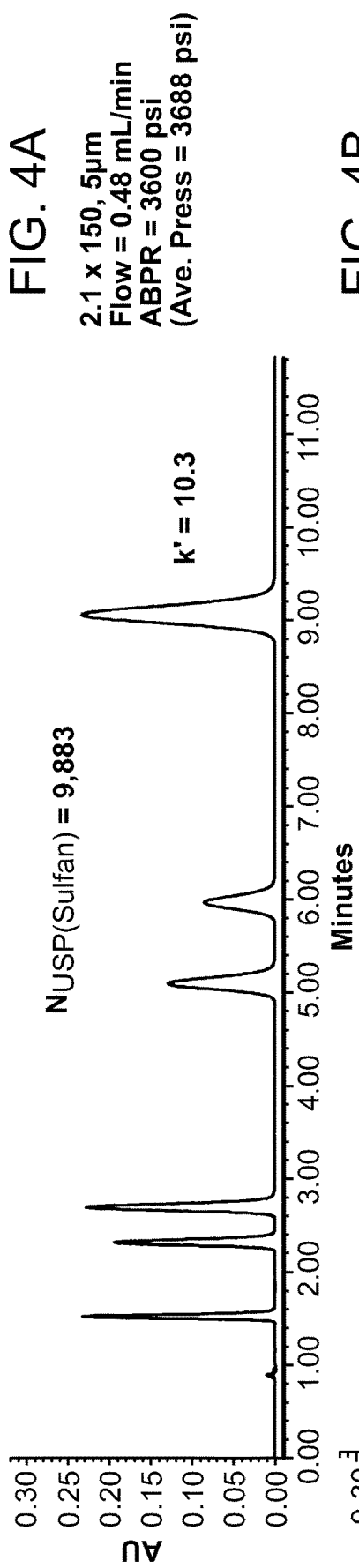
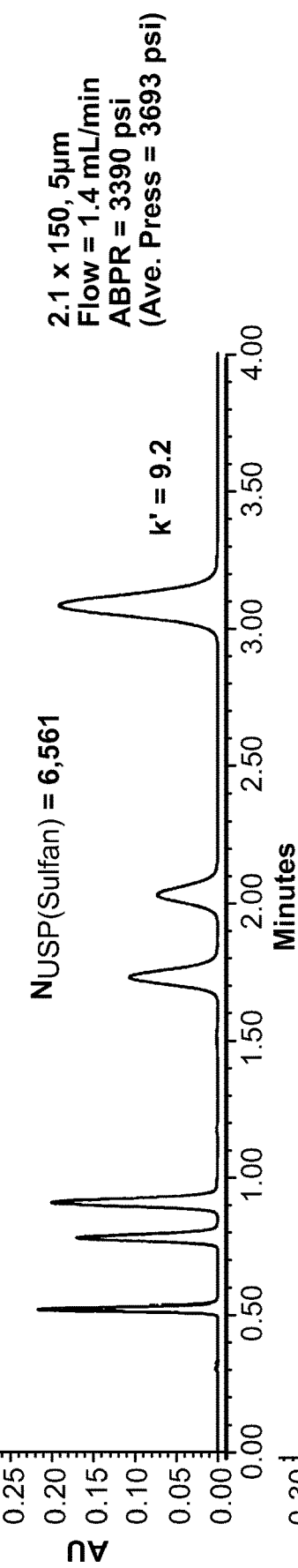
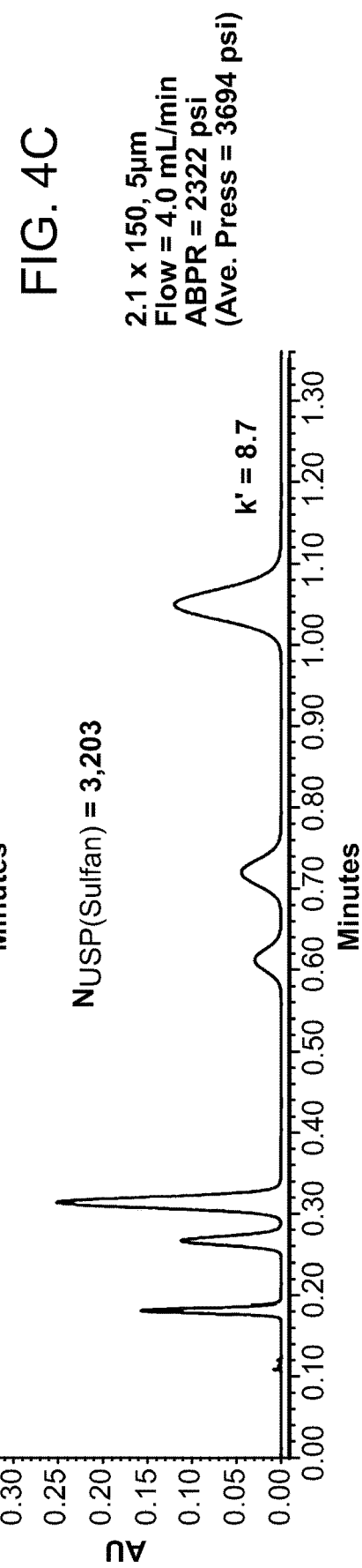

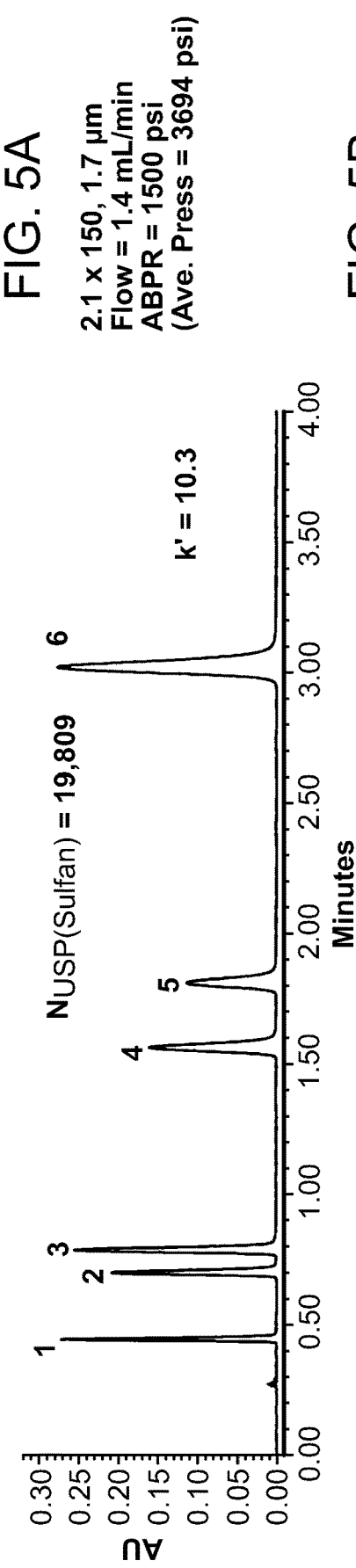
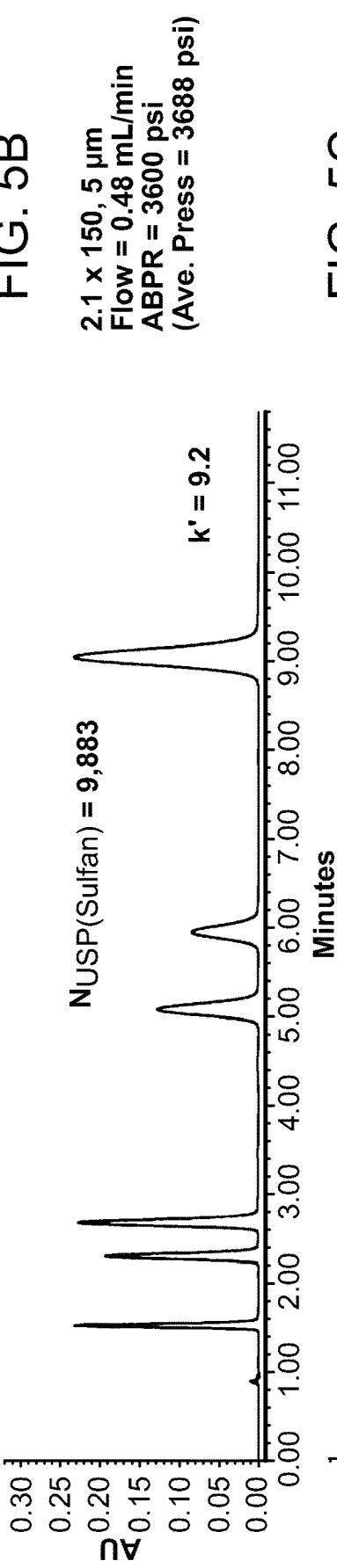
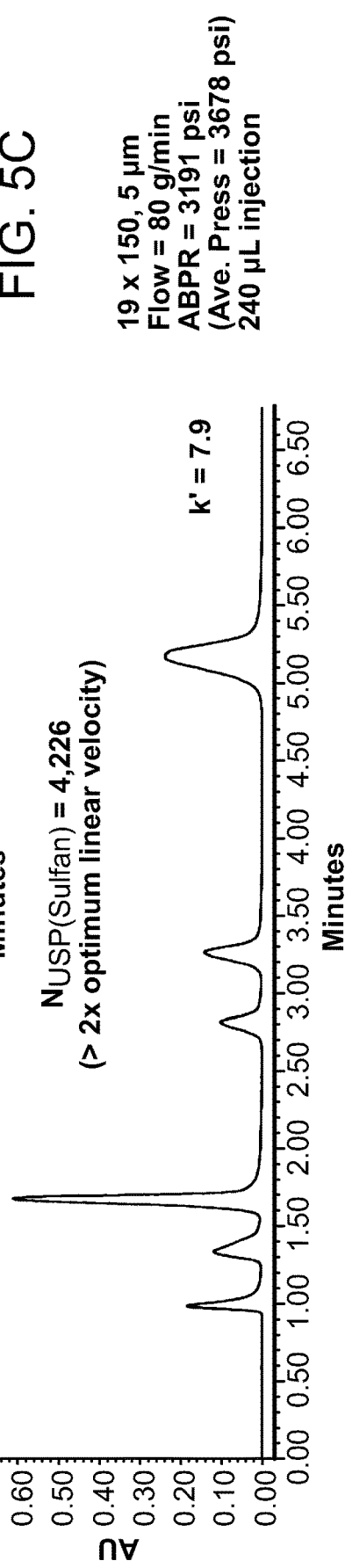

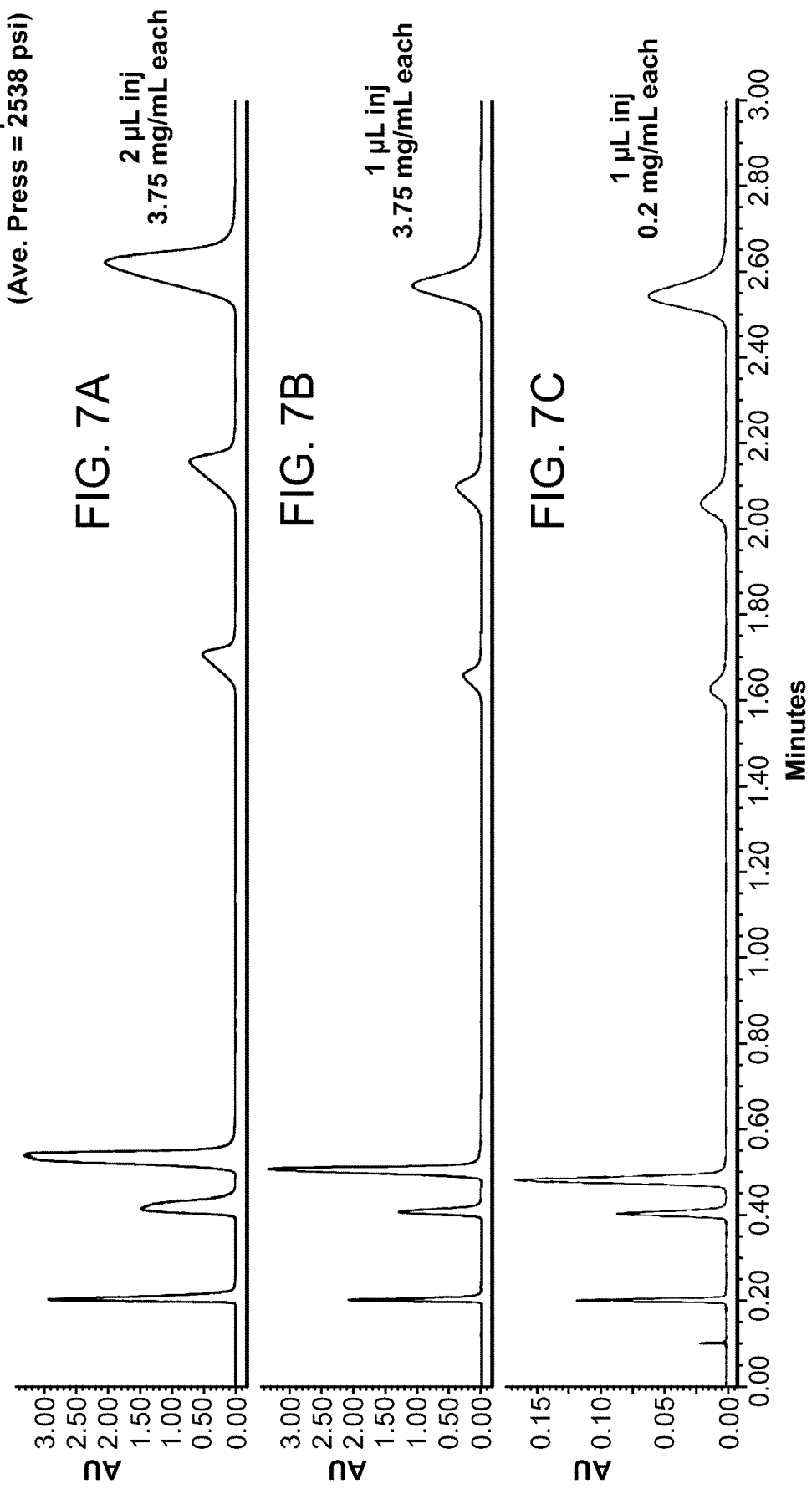

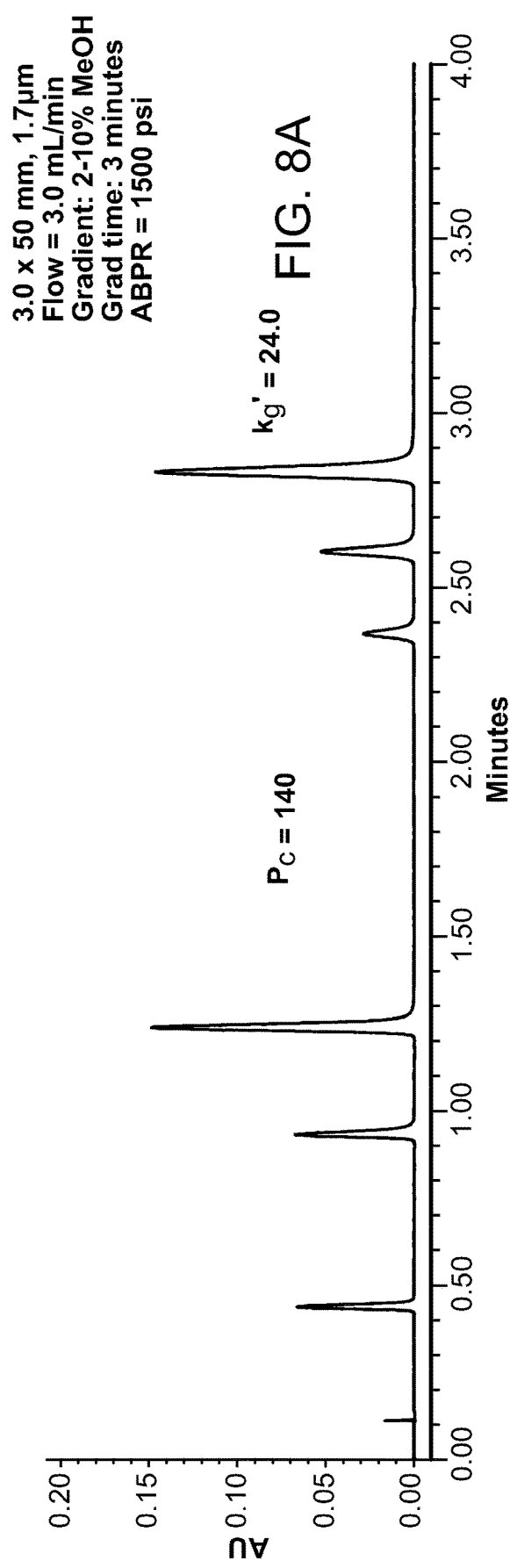
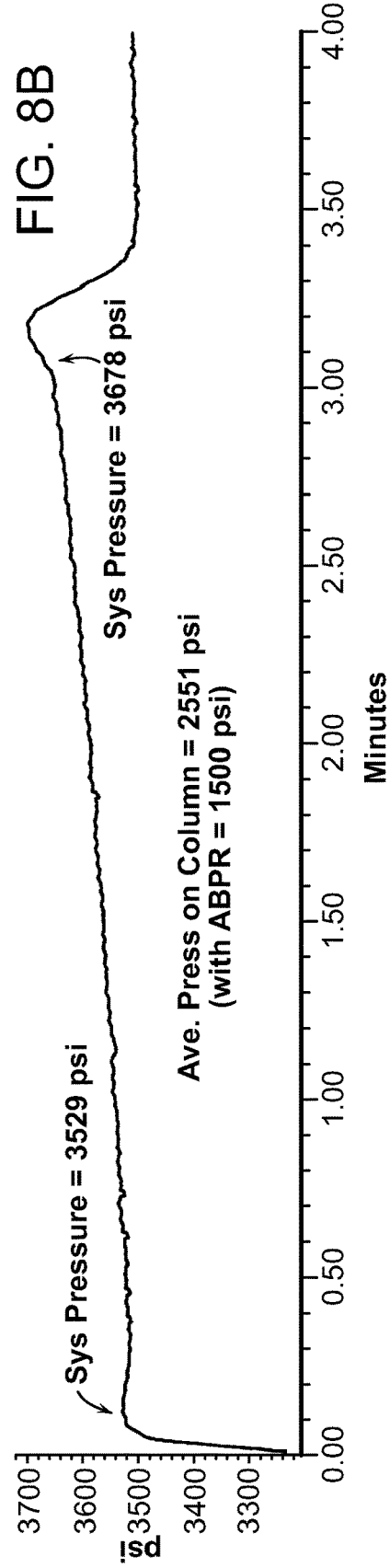

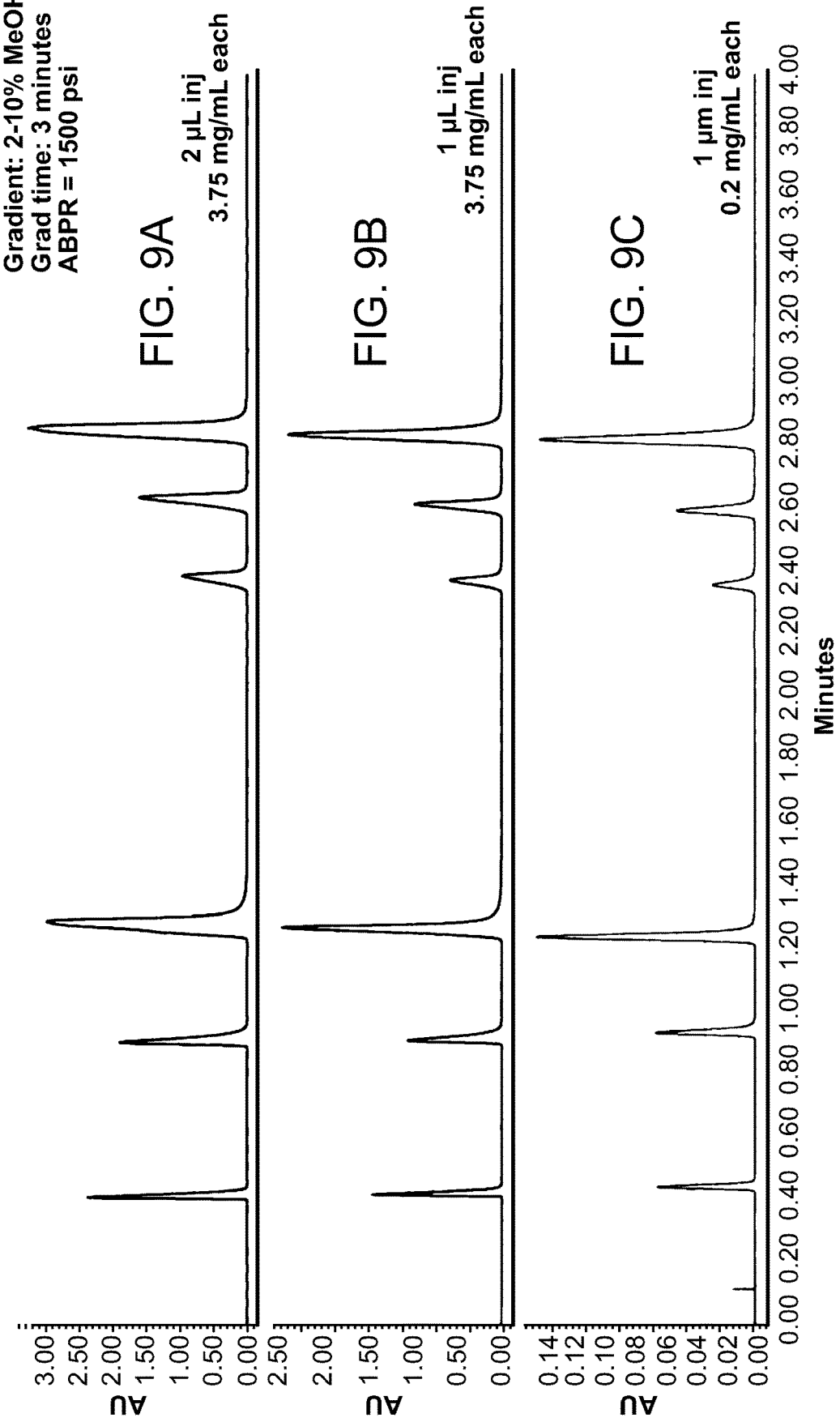

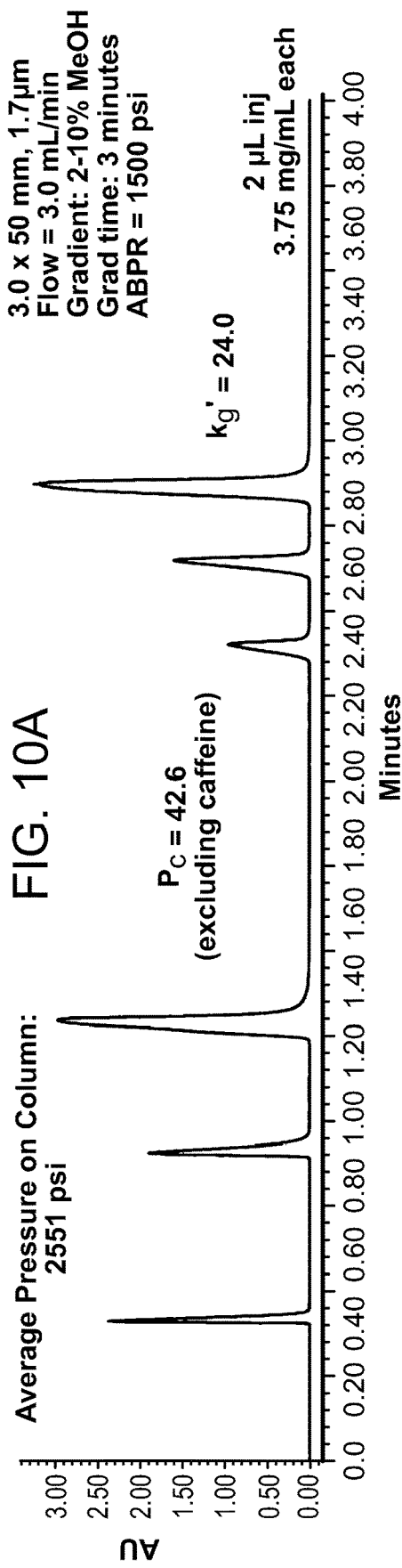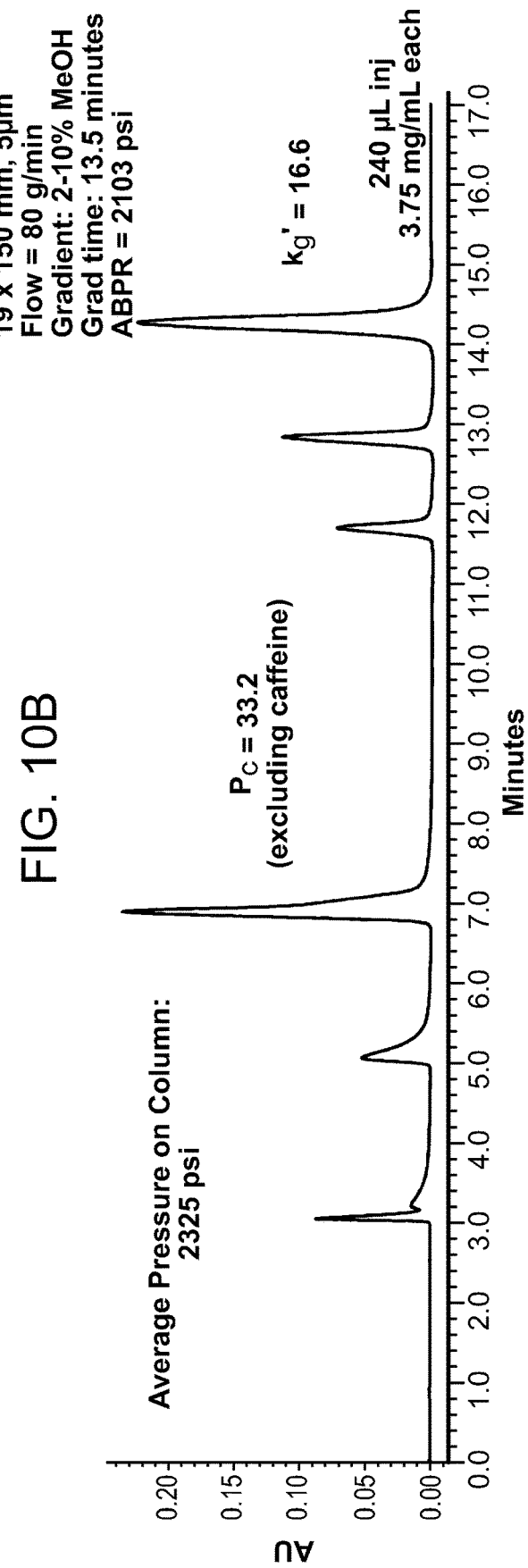
FIG. 10A
FIG. 10B

Peak 3 K'
(low back pressure system, 300 psi)

Peak 3 K'
(high back pressure system, 2,000 psi)

METHODOLOGY FOR SCALING METHODS BETWEEN SUPERCRITICAL FLUID CHROMATOGRAPHY SYSTEMS

RELATED APPLICATIONS

This application is a National Stage Application of International Application Number PCT/US2014/042076, filed Jun. 12, 2014, which claims the benefit of and priority to U.S. Provisional Application No. 61/835,055, filed Jun. 14, 2013, and U.S. Provisional Application No. 61/835,556, filed Jun. 15, 2013. Each of the foregoing applications are incorporated herein by reference in their entirety.

FIELD OF THE TECHNOLOGY

The present disclosure relates to methodology for scaling supercritical fluid chromatography and/or carbon dioxide based chromatography methods between different system and/or column configurations. The methodology involves mobile phase density or pressure control to approximate or maintain average solvent properties in the region of interest in the chromatographic system.

BACKGROUND

Developing a successful chromatographic separation usually requires extensive method development. Such method development often involves the evaluation and optimization of numerous variables. These variables may include the choice of chromatographic system, e.g., carbon dioxide based chromatography, SFC, HPLC, GC, the choice of mobile phase, the choice of column chemistry and column dimensions, the choice of detector, etc. Once a successful chromatographic separation has been developed it will invariably need to be transferred and performed on different chromatographic systems. For example, an analytical scale SFC separation may need to be transferred and performed on a preparative scale SFC system.

For liquid chromatography, the theory and understanding for transferring methods between different system or column configurations is generally well understood. Guidelines for transferring LC methods are straightforward. Method transfers under LC conditions typically do not need additional or multiple rounds of optimization. In SFC and/or carbon dioxide based chromatography, however, there is currently no such methodology in place to facilitate method transfer. Chromatographic separations using carbon dioxide as a mobile phase that are transferred from one chromatographic system to another chromatographic system typically need to be re-developed to achieve the same successful separation as achieved on the original chromatographic system. Re-development is time-consuming, expensive and wasteful.

SUMMARY

The present disclosure relates to methodology for transferring supercritical fluid chromatography and/or carbon dioxide based chromatography methods between different system (e.g., analytical versus preparative) and/or column configurations (e.g., column size, column geometry, stationary phase) without excessive re-optimization.

In separations using carbon dioxide ($CO_2$) as the principal mobile phase component, analyte retention factors are influenced largely by the mobile phase density and temperature. Because of the high compressibility of CO2 under standard operating conditions, the density can change significantly with changes in pressure (under isothermal conditions), with retention factors decreasing with increasing mobile phase density (pressure). In addition, the selectivity and resolution of the analytes may be impacted as they respond differently to the same changes in mobile phase density. This can present a challenge when attempting to transfer a method between different column configurations that involve changes in column length or station phase particle size, which in turn alters the pressure (density) profile for the separation. This is best exemplified when analytical scale separations, such as those using a sub two micron particle stationary phase and include $CO_2$ as the principal mobile phase component, are scaled up for preparative carbon-dioxide based chromatography conditions, employing a five micron particle stationary phase. In the past, differences in density profiles across the column, between these two different systems lead to very different chromatography results. Using one or more of the methodologies of the present disclosure, the scale-up process between these two different systems/set of operating conditions is minimal as the methodologies provide guidelines for transfer.

In one aspect, the present disclosure relates to a method of efficiently transferring a carbon dioxide based separation procedure between at least two different carbon dioxide based separation systems. The method includes (1) determining at least one of an average mobile phase density or average pressure on column for a first carbon dioxide based separation on a first carbon dioxide based separation system, and (2) performing a second carbon dioxide based separation on the second carbon dioxide based separation system substantially at the average mobile phase density or average pressure on column as the first separation. In this disclosure, "substantially at" means "at the same" or "close to the same." For example, "substantially at" can be at a value within about 10% of the average mobile phase density or average pressure on column as determined for the first carbon dioxide based separation system. Further, "substantially at" can be at a value within about 5%; 2.5%, 1%; 0.5%; 0.1%; 0.05% of the average mobile phase density or average pressure on column as determined for the first carbon dioxide based separation system. In general, it is desirable to perform the second carbon based dioxide based separation under conditions that result in an average mobile phase density or average pressure on column in the second system that is as close as possible (e.g., 2.5%, 1%; 0.5%; 0.1%, 0.05%, 0% difference) to the average mobile phase density or average pressure on column determined in the first system. Preferably, the second carbon dioxide based separation performed on the second system exhibits substantially the same retention factor (k') or selectivity, per target analyte(s), as the first carbon dioxide based separation performed on the first system. In this disclosure, "substantially the same" means "the same" or "similar to." That is, one of ordinary skill in the art would consider the retention factors (k') of the first and second separations to be similar, especially in light differences in overall system volume. For example, in some embodiments, "substantially the same" is a value within about 35%. In other embodiments, "substantially the same" is a value within about 25%; is a value within about 20%; is a value within about 15%; is a value within about 10%; is a value within about 5%, is a value within about 1%. The methodology of the present disclosure may be useful for transferring methods between two analytical scale carbon dioxide based separation systems, two preparative scale carbon dioxide based separation systems, and combinations thereof.

In another aspect, the present disclosure relates to a method of transferring a carbon dioxide based separation procedure from a first system to a second system without re-optimizing the separation procedure conditions of the second system, comprising operating both systems at substantially the same average mobile phase density or average pressure on column. The use of either the average mobile phase density or the average column pressure provides a means of efficiently transferring the separation procedures. In some embodiments, the mobile phase density is preferred. The average mobile phase density and average column pressure are calculated by density or pressure measurements at two points (or at least two points), one upstream and one downstream of the separation column.

In another aspect, the present disclosure relates to a carbon dioxide based separation system comprising a pump, a column located downstream of the pump, a back pressure regulator located downstream of the column, at least two density or pressure sensors, one located upstream of the column and one located downstream of the column for determining or calculating the average mobile phase density or average column pressure, and a density or pressure controller in communication with the at least two sensors (the density or pressure controller) adapted to adjust system parameters to achieve at least one of a pre-determined average mobile phase density or pre-determined average column pressure in response to density or pressure measurements from the at least two sensors.

Embodiments of the above aspects can include one or more of the following features. In some embodiments, the two systems may use the same or different separation columns. Where two different columns are used (e.g., different sized columns), the different columns may have similar stationary phases or column chemistry (i.e., same type of stationary phase, substantially the same column chemistry). Other differences between the two systems in any of the above aspects may include the use of two different detectors or the use of two different columns having different column configurations, e.g., particle size, inner diameter (i.d.) or length. Further differences may include the use of two different systems, such as for example an analytical scale system versus a preparative scale system. Some embodiments include an active back pressure regulator (APBR) located downstream of the column.

The technology of the present disclosure provides numerous advantages. For example the methodologies described herein allow for the efficient transfer of carbon dioxide based chromatographic methods between different system and/or column configurations. The same successful separation on one system can be transferred to a second system without excessive time, money or resources being expended on re-optimizing the second separation on the second system. That is, the transfer is efficient as it is based on the disclosed methodologies rather the empirical observations. In some embodiments, the methodology facilitates the transfer of methods between different systems that have different pressure profiles, e.g. carbon dioxide based chromatographic systems having a PDA detector, or equivalent, and systems having a ELS or MS detector, or equivalent.

BRIEF DESCRIPTION OF THE DRAWINGS

The foregoing and other features and advantages provided by the present disclosure will be more fully understood from the following description of exemplary embodiments when read together with the accompanying drawings.

FIG. 1A shows an embodiment having a detector capable of operating and detecting target analytes under normal column operating conditions, e.g., high pressures. FIG. 1B shows a separation system having a detector located downstream of a backpressure regulator and operating at pressures at or near atmospheric pressure. FIG. 1C shows a separation system having a detector located in parallel to the backpressure regulator. The detector, operating at pressures at or near atmospheric pressure, functions as a controlled leak in the system, altering pressure profiles from a "closed" system configuration (as in FIG. 1A). To function successfully, the connective tubing to the detector needs to be sufficiently restrictive, e.g., small i.d. or long length, to maintain the required pressures on column. Overall pressure on the system will be determined by the combined pressure restriction of this tubing with the pressure restriction of a back pressure regulator, such as an active back pressure regulator (ABPR). FIG. 1D shows a separation system with the column outlet directly connected to the detector, operating at pressures at or near atmospheric pressure. As in configuration 1C, the connective tubing to the detector needs to be sufficiently restrictive to maintain the required pressures on column. The overall pressure on the system will be determined only by the pressure restriction of this tubing and can only be modified by changes in this tubing configuration (i.d. or length). The exemplary locations are designated A-H.

FIGS. 2A-D and 2F demonstrate the transfer of a method developed on a 1.7 μm particle to a larger 5 μm particle, with and without matching the average density or average pressure profile for the separation. For this separation, the flow rate was not scaled to the optimum linear velocity. FIGS. 2E and 2G show a comparison of mobile phase density simulations across the column length without and with average density matching, respectively.

FIGS. 3A-3C demonstrate the transfer of a method developed on a 1.7 μm particle to a larger 5 μm particle, with and without matching the average density or average pressure profile for the separation, while scaling the flow rate to the lower optimum linear velocity for the 5 μm particle size. In particular, the results shown in FIG. 3B are not matched to the average density or average pressure profile of FIG. 3A; whereas the results shown in FIG. 3C are matched/similar to FIG. 3A (average pressure of 3694 psi compared to average pressure of 3688 psi).

FIGS. 4A-4C show a comparison of separations obtained on analytical scale carbon dioxide based chromatographic systems having the same average column pressure but different mobile phase flow rates, while matching the average density profiles for the separations. Without density matching, the changes in flow rates would result in significant differences in density profiles for the separations which would result in a loss of chromatographic integrity between the separations.

FIGS. 5A-5C and FIGS. 6A-B show a comparison of separations obtained on an analytical scale carbon dioxide based chromatographic system and a preparative scale carbon dioxide based chromatographic system having the same average column pressure.

FIGS. 7A-C show a comparison of separations obtained on the same analytical scale carbon dioxide based chromatographic system having the same average column pressure but different injection volumes and sample analyte concentrations.

FIGS. 8A-B show a gradient separation on an analytical scale carbon dioxide based chromatographic system.

FIG. 9A-C shows a comparison of gradient separations obtained on the same analytical scale carbon dioxide based chromatographic system having the same average column pressure but different injection volumes and sample analyte concentrations.

FIGS. 10A-B show a comparison of gradient separations obtained on an analytical scale carbon dioxide based chromatographic system and a preparative scale carbon dioxide based chromatographic system having similar average column pressures. FIG. 10B shows a simulation of the density profiles of the corresponding gradient separations.

DETAILED DESCRIPTION

Figure 1A:
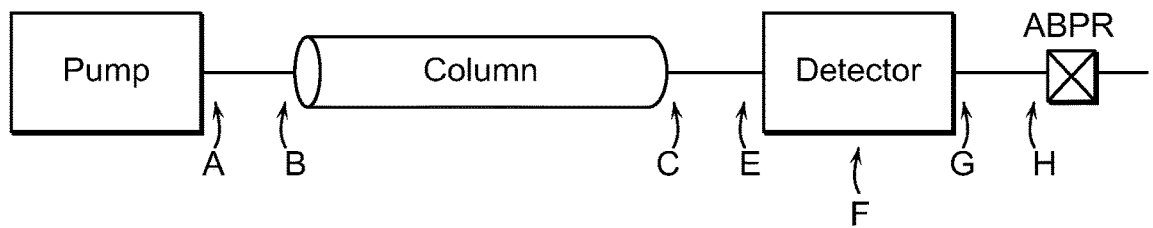
FIGS. 1A-1D show embodiments of separation systems and exemplary locations where the mobile phase density or pressure sensors, e.g., transducers, may be located and the density and pressure values may be determined.

Analyte retention factors in carbon dioxide based chromatographic separations are influenced by the mobile phase density. The mobile phase density can change significantly with changes in pressure under isothermal conditions. Carbon dioxide is highly compressible under standard operating conditions. Typically, retention factors decrease as mobile phase density (or pressure) increases.

Some analytes, however, may respond differently to changes in mobile phase density as a result of changes in system configuration. For example, the selectivity and resolution of target analytes may be disproportionately impacted as each responds differently to the same changes in system conditions, e.g., mobile phase density or system pressure. This differential response can present a challenge when attempting to transfer methods between different carbon dioxide based chromatographic systems that involve changes in the mobile phase density or column pressure profiles for the separation.

For example, slight differences in tubing dimensions, e.g., length or internal diameters, in a system can affect the overall system density and pressure profiles. Likewise, a change in detection system configuration can affect the overall system density and pressure profiles. Detectors based on nebulization techniques, e.g., MS or ELS, involve nebulization under near or at atmospheric pressure. These techniques introduce a controlled leak in the system which can result in lower overall system densities or pressures relative to a closed detection system, e.g., PDA detector, or where system pressure is maintained by a back pressure restriction device. For columns, changes in column length or particle size can affect the overall system density and pressure profiles. A common example is the scale up of an analytical scale separation developed using a sub-2 µm particle size stationary phase to a preparative scale separation using a 5 µm particle size stationary phase. The difference in the density and pressure profiles across the column, between the analytical and the preparative system, can lead to very different chromatography.

Without wishing to be bound by any particular theory, it is believed that by matching the mobile phase density profile that a particular target analyte experiences between two separation systems, using the same column chemistry, the analyte retention factors and separation efficiency may be maintained. Therefore, it would be advantageous to have a characterized mobile phase density profile for any separation. The average density profile could then be maintained during transfer of methods between different system and/or column configurations. Equipment to measure mobile phase densities is expensive. The calculation of densities is difficult because of the often changing temperature, pressure, mobile phase composition and viscosities used for separations. As an approximation, the column pressure, e.g., system pressure measured at the pump and the backpressure regulator, e.g., ABPR, outlet pressure, can be used to calculate the average column pressure for a separation. These pressure measurements are easier to obtain than density measurements. The maintenance of this average column pressure between separations is a close approximation to the maintenance of the average mobile phase density across the separation. Matching either the average mobile phase density or the average column pressure between two carbon dioxide based chromatographic separations can result in separations having target analytes with similar selectivity and retention factor characteristics.

In one embodiment, the present disclosure relates to a method of efficiently transferring a carbon dioxide based separation procedure between at least two different carbon dioxide based separation systems comprising determining an average mobile phase density or average column pressure for a first carbon dioxide based separation on the first carbon dioxide based separation system, and performing a second carbon dioxide based separation on the second carbon dioxide based separation system at the average mobile phase density or average column pressure measured on the first system.

As provided herein, the phrase "efficiently transferring" of a carbon dioxide based separation refers to the concept of transferring a separation, methodology or method parameters between carbon dioxide based separation systems while maintaining the chromatographic integrity of the separation, e.g., preserving retention factors and selectivity of at least one target analyte, preferably two or more target analytes. An efficiently transferred separation is one that substantially reproduces the chromatographic integrity of the separation obtained on the first system on the second system. For example, an efficiently transferred separation is one wherein the second carbon dioxide based separation performed on the second system has a target analyte, or target analytes, having substantially the same retention factor (k') or selectivity as the first carbon dioxide based separation performed on the first system.

As provided herein, the term "retention factor" or "(k')" refers to the ratio of time an analyte is retained in the stationary phase to the time it is retained in the mobile phase under either isocratic or gradient conditions. For an efficiently transferred carbon dioxide based chromatographic method, the difference in retention factor for any given target analyte between a first and a second separation should be minimized. Preferably, the difference in retention factor for a target analyte between a first and a second separation is less than about 10%. More preferably, the difference in retention factor for a target analyte between a first and a second separation is less than about 5%. Even more preferably, the difference in retention factor for a target analyte between a first and a second separation is less than about 1%.

For multiple target analytes, the difference in retention factor for each target analyte, respectively, between a first and a second separation should also be minimized. Multiple target analytes may include 2 or more target analytes, e.g., 2, 3, 4, 5, 6, 7, 8, 9, 10, etc. Preferably, all or a majority of the target analytes have substantially the same retention factor between the first and second separations. Because all analytes respond differently to system changes, not all of the target analytes may have substantially the same retention factor between the first and second separations. Preferably, the difference in retention factor for each multiple target analyte, respectively, between a first and a second separation is less than about 10%. More preferably, the difference in retention factor for each multiple target analyte, respectively, between a first and a second separation is less than about 5%. Even more preferably, the difference in retention factors for each multiple target analyte, respectively, between a first and a second separation is less than about 1%.

As provided herein, the term "selectivity" or "selectivity factor" or "a" refers to the degree of separation of two analytes in a separation. For example, the selectivity factor for two analytes, A and B, is the ratio of their respective retention factors, provided A elutes before B, e.g., $\alpha=k'_B/k'_A$.

The selectivity between two target analytes between a first and a second separation should be maintained. Preferably, the change in selectivity for two target analytes between a first and a second separation is less than about 10%. More preferably, the change in selectivity for two target analytes between a first and a second separation is less than about 5%. Even more preferably, the change in selectivity for two target analytes between a first and a second separation is less than about 1%.

As provided herein, the phrase "a carbon dioxide based separation procedure" refers to system requirements, method parameters and/or settings used with a particular carbon dioxide based separation system to control or effect a separation of target analytes on the particular carbon dioxide based separation system. The mobile phase in a carbon dioxide based separation or chromatography system includes at least, in part, carbon dioxide.

In some embodiments, the present disclosure relates to chromatography systems and chromatographic separations that use other mobile phase solvents or compositions that have similar compressibility properties as carbon dioxide, such as Freon. Preferably, the other mobile phase solvents or compositions exhibit the same or similar effect on analyte behavior due to changes in mobile phase density or pressure as described herein.

As provided herein, the phrase "separation system" refers to instrumentality or equipment, e.g., a pump, a column, a detector and accompanying accessories, that are used to perform the separation and detection of target analytes. In some configurations, the separation system may exclude one or more of these components, e.g., pump or detector.

The distinction between different separation systems, e.g., a first separation system and a second separation system, may include any change in the system configuration that results in a change in the overall operating average mobile phase density or average column pressure. For example, the distinction between different separation systems may be the use of different instruments such as a carbon dioxide based analytical chromatography system, for example a system commercially available from Waters Technologies Corporation (Milford, Mass.) and branded as an ACQUITY® UPC² system versus a carbon dioxide based preparative chromatography system, for example a system commercially available from Waters Technologies Corporation (Milford, Mass.) and branded as a Prep 100 SFC system. The distinction may also be a change in one or more components on the same instrument, e.g., a change in system configuration. For example, the distinction may be a change in tubing, e.g., length or internal diameter, or the presence of a tubing valve. It may also be a change in column configuration, e.g. length, internal diameter or particle size. Preferably, the methodology of the present disclosure may be applied to any change or distinction, e.g. instrument, column particle size, column length, flow rate, etc., between different separation systems which results in greater than about a 10% change in overall operating average mobile phase density or average column pressure. More preferably, the methodology of the present disclosure may be applied to any change or distinction which results in greater than about a 5% change in overall operating average mobile phase density or average column pressure. Even more preferably, the methodology of the present disclosure may be applied to any change or distinction which results in greater than about a 1% change in overall operating average mobile phase density or average column pressure.

The distinction may also be a change in detector configuration, e.g. wherein the first system has a first detector different than the second detector on the second system. A change in detector may affect the average mobile phase density or average column pressure. For example, a first separation system may have detector capable of detecting target analytes in the mobile phase while under column operating conditions, e.g., elevated pressures, such as a PDA detector. A separation system having such a detector may employ the backpressure regulator to maintain a controlled pressure on the system to achieve a desired overall operating average mobile phase density or average column pressure, as well as to maintain the carbon dioxide mobile phase system in the liquid state. A change from a PDA detector, or equivalent, to a similar PDA detector, or equivalent, may affect the average mobile phase density or average column pressure. The mobile phase density or system pressure change may be caused by a change in connections, e.g., size and shape, used by the two detectors. It may also be caused by a change in the configuration or dimensions of the detector cells used by the two detectors.

A change in detector from one capable of detecting compounds of interest in the mobile phase while under column operating conditions, e.g., elevated pressures, to one requiring the mobile phase to be at, or near, atmospheric pressure may also affect the average mobile phase density or average column pressure. For example, the addition of a nebulization based detector, e.g., ELS or MS, represents the introduction of a controlled leak to the system. The addition of a nebulization based detector, or equivalent, changes the overall pressure profile of the separation and may change the chromatographic characteristics of the separation. An equivalent detector may include FID or similar type detectors which may be adapted to use with carbon dioxide based separation systems.

Column stationary phases may differ in regard to chemistry, base particle, ligand, bonding density, endcapping, pore size, etc. Column manufacturers typically produce columns having the same stationary phase, e.g., same chemistry, same base particle, same ligand, same bonding density, same endcapping and same pore size, in several different particle size and column dimension configurations. In one embodiment, the two different separation systems have a first and a second respective column, wherein the first and second columns have similar stationary phases. The similar stationary phases may have, at least, same chemistry, same base particle, same ligand, same bonding density, same endcapping or same pore size. Preferably, the similar stationary phases have the same chemistry.

The methodology of the present disclosure may be useful for transferring separations between analytical scale systems, preparative scale systems and combinations thereof. For example, the present methodology may be useful in transferring a separation from an analytical scale system to a preparative scale system, or a preparative scale system to an analytical scale system. The present methodology may also be useful in transferring a separation from one analytical scale system to another analytical scale system, or from one preparative scale system to another preparative scale system. A list of systems for which the present disclosure may be applicable include, but is not limited to, carbon dioxide based chromatography systems commercially available from Waters Technologies Corporation (Milford, Mass.) and branded as ACQUITY® UPC$^2$, Method Station SFC, Resolution SFC MS, Preparative SFC Instruments (e.g., Investigator SFC, Prep 100 SFC, SFC 80/200/350 Preparative Systems), UPC$^2$ and SFC columns including both chiral and achiral stationary phases.

In another embodiment, the present disclosure relates to a method of transferring a carbon dioxide based separation procedure from a first system to a second system without re-optimizing the separation procedure conditions of the second system, comprising operating both systems at the same average mobile phase density or average column pressure. The first system may be a carbon dioxide based separation system having at least a first pump, a first column located downstream of the first pump, a first ABPR located downstream of the first column and a first detector located either downstream of the first ABPR or downstream of the first column and upstream of the first ABPR. The second system may be a carbon dioxide based separation system having at least a second pump, a second column located downstream of the second pump, a second ABPR located downstream of the second column and a second detector located either downstream of the second ABPR or downstream of the second column and upstream of the second ABPR. The first and second separation systems differ in at least one aspect, e.g., instrument, instrument component, detector, column configuration, such that there is a difference in the overall operating average mobile phase density or average column pressure between the two systems. The difference may be a greater than about a 10%, preferably a 5%, and more preferably a 1% change in overall operating average mobile phase density or average column pressure between the two systems.

The methodology of the present disclosure involves matching, or substantially matching, the average mobile phase density profile or average column pressure profile that a particular target analyte experiences between the two separation systems. In some embodiments, the methodology involves matching, or substantially matching, the average mobile phase density profile or average column pressure profile that multiple target analytes experience between the two systems. In a carbon dioxide based separation system, the largest density and pressure change in the system is usually the density or pressure drop across the column. Determining the average mobile phase density, e.g., the average column mobile phase density, may be performed using density sensors upstream and downstream of the column. In some embodiments, other components may also cause a density or pressure drop across the component, e.g., some detectors located before the backpressure regulator, tubing, or tubing valve. The density or pressure drop across these components also contribute to the average mobile phase density. Density or pressure measurements may be taken upstream, downstream or across these other components.

In one embodiment, a simple carbon dioxide based chromatographic system may have a pressure transducer to measure the system pressure at the pump, or the beginning of the system, and another transducer at the ABPR, or the end of the system, to approximate the average column pressure. In this system, the majority of the system pressure drop occurs in the column. In a more complex system, additional system pressure drops may occur due to other components, e.g., a pressure drop due to the tubing valve. A more complex calculation can be preformed to account for these additional drops, such as by modification to vary the weighing factors of the pressure readings from the various transducers.

Figure 1B:
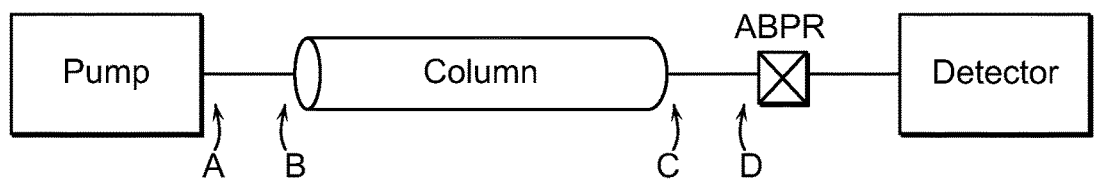
Figure 1C:
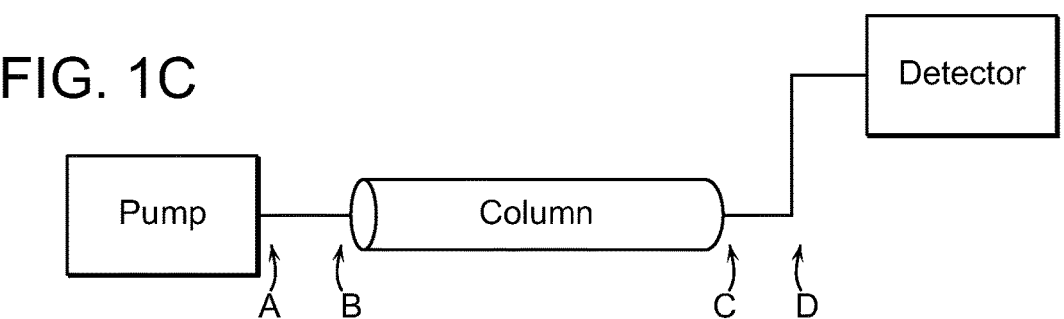
Figure 1D:
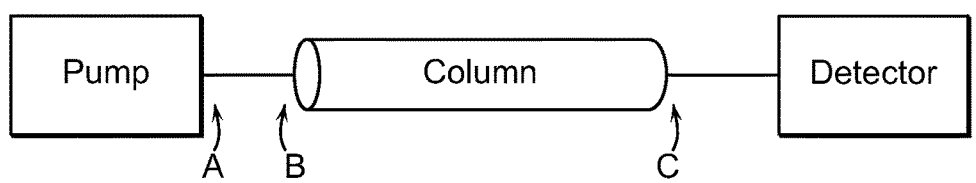

The location for measuring the densities or pressures in the system may vary. FIGS. 1A-1D show different locations where the density or pressure may be measured. In particular, FIG. 1A shows a separation system wherein the detector is located upstream of the backpressure regulator and is capable of operating and detecting target analytes under normal column operating conditions, e.g. high pressures. Upstream of the column, measurements may be taken at the designated points A (at or directly after the pump) or B (at the head of the column), or at any point in between. Downstream of the column, measurements may be taken at the designated points C (at the base of the column) or E (at the head of the detector), or at any point in between. Across any component, a measurement may be taken in the component. For example, a measurement may be taken at point F in the detector. Downstream of the detector, measurements may be taken at the designated points G (at the base of the detector) or H (at the backpressure regulator), or at any point in between. FIGS. 1B-1D show additional separation systems wherein the system components are configured in alternate arrangements.

Preferably, the location(s) for measuring the density or pressure in a first system is similar or equivalent to the location(s) in a second system. For example, if the location for measuring the density or pressure upstream of the column for the first system is at the pump then preferably the location for measuring the density or pressure upstream of the column for the second system is also at the pump. If the location for measuring the density or pressure downstream of the column for the first system is at the backpressure regulator then preferably the location for measuring the density or pressure downstream of the column for the second system is also at the backpressure regulator.

In one embodiment, the average mobile phase density or average column pressure is the average mobile phase density or pressure calculated from (i) the inlet mobile phase density or pressure measured at the head of the column and (ii) the output mobile phase density or pressure measured at the base of the column. In another embodiment, the average mobile phase density or average column pressure is the average mobile phase density or pressure calculated from (i) the mobile phase density or pressure measured at the output of the pump and (ii) the mobile phase density or pressure measured at the ABPR inlet. Combinations of these embodiments may also be used to determine the average mobile phase density or average column pressure.

The methodology of the present disclosure is applicable to both isocratic separations and gradient separations. Determining the average mobile phase density or average column pressure for an isocratic separation may be done by averaging the pressure measurements across the system, e.g., across the column and/or across any additional components which affect the density or pressure of the system. In a simple separation system configuration where the detector does not cause a significant density or pressure change in the system, the measurements may be taken upstream of and downstream of the column. These measurements are averaged to obtain the average mobile phase density or average column pressure for an isocratic separation.

Determining the average mobile phase density or average column pressure for a gradient separation may be done by averaging pressure measurements across the system taken at both the initial gradient conditions and the final gradient conditions. For example, a carbon dioxide based separation may use a gradient starting at 5% modifier in the carbon dioxide mobile phase and ending at 40% modifier. Preferably, the gradient is linear and continuous. Measurements are made at the initial conditions, i.e., 5% modifier. For instance, the backpressure regulator pressure value may be 2,000 psi and the pressure value upstream of the column may be 3,500 psi. Additional measurements are made at the final conditions, i.e. 40% modifier. For instance, the backpressure regulator pressure value may be 2,000 psi and the pressure value upstream of the column may be 4,500 psi. The average measurement for the initial conditions (3,500 psi and 2,000 psi) is 2,750 psi. The average measurement for the final conditions (4,500 psi and 2,000 psi) is 3,250 psi. The average of these average measurements (2,750 psi and 3,250 psi) is 3,000 psi. Upon transferring the gradient separation to a second separation procedure on a second separation system, the second separation should be performed at an average column pressure of 3,000 psi. The average column pressure on the second separation system should be calculated using similar procedures described above depending on whether the second separation procedure is performed under isocratic or gradient conditions.

After the average mobile phase density or average column pressure for the first separation on the first system has been measured or determined, the second separation on the second system should be performed at the measured or determined average mobile phase density or average column pressure. Achieving the average mobile phase density or average column pressure on the second separation system may be accomplished by routine optimization. For example, system parameters may be incrementally changed after the second separation system has equilibrated and adjusted toward the predetermined average mobile phase density or average column pressure measured or determined for the first separation on the first system. One advantage of the methodology of the present disclosure is that optimization is focused on one main parameter, e.g., average mobile phase density or average column pressure, for optimizing the second separation on the second system, e.g., by iteration, rather than by optimizing all variables by trial and error. The average mobile phase density or average column pressure on the second separation system may also be achieved by using a controller.

In another embodiment, the present disclosure relates to a carbon dioxide based separation system comprising a pump, a column located downstream of the pump, a back pressure regulator located downstream of the column, at least two density or pressure sensors, one located upstream of the column and one located downstream of the column for measuring the average mobile phase density or pressure, and a density or pressure controller in communication with the at least two sensors capable of adjusting system parameters to achieve a pre-determined average mobile phase density or pressure in response to density or pressure measurements from the at least two sensors. The number and location of the sensors may be adjusted based on the presence of additional components, e.g., detector, that may cause a substantial density or pressure drop in the system. Additional sensors may be present to measure the density or pressure upstream, across and downstream of these components, as well. In a simple system, only two sensors (pressure or density) are required. Ideally, these sensors are located at the inlet and outlet of the column. Pressure drop between the pump and column inlet is minimal. Similarly, the pressure drop between the column outlet and ABPR is minimal. These sensors may also be located at the pump outlet and ABPR. For example, the system pressure sensor and the ABPR sensor may be used.

The density or pressure controller may be any device, system, program, software or combination thereof, that controls the mobile phase density or pressure (or other parameter) within the chromatographic system. In carbon dioxide based chromatographic systems, carbon dioxide properties vary throughout. To optimize the consistency of the separation, the controller should be controlling, at least, the property of interest at the point of interest. In most cases, this is the average solvating power (elutropic strength) in the column.

Existing systems control temperature at the column and pressure at the end of the system. Direct control of the properties of the system or in the column is not available. The present disclosure allows for control over these parameters, e.g. mobile phase density and system pressure. By controlling these parameters, more consistent analyte behavior is obtained. The controller may be configured to adjust the system parameters, e.g., pressure or temperature, at various locations based on sensor readings to automatically or contiguously adjusting the parameters to obtain the desired average mobile phase density or average column pressure. The adjustments, prior to obtaining the desired average mobile phase density or average column pressure, may be made prior to the system reaching equilibrium. For example, the system may monitor the average column pressure:

$$\text{Average Column Pressure} = [(\text{System Pressure at Pump} + \text{ABPR Pressure})/2],$$

and automatically adjust the ABPR setting to maintain the average column pressure at a constant value.

Controlling the average mobile phase density or average column pressure makes carbon dioxide based chromatography scalable. An analyte's retention time, and other behavior, is also related to temperature since mobile phase density is a factor of both temperature and pressure. The controller may also have the ability to control the column or system temperature to achieve or maintain a consistent or predetermined value.

The software for the controller may be incorporated into the software, programming, or operating system used to control or manage the chromatographic system, e.g. commercially available systems from Waters Technologies Corporation (Milford, Mass.) and branded as Convergence Manager for ACQUITY® UPC$^2$.

As described herein, the average mobile phase density may be either measured directly, calculated, or approximated using system pressure measurements. The average pressure profile may be used as a close approximation to duplicate average density profiles between separations. It is within the scope of the present disclosure to use actual density measurements or calculations of those densities, if and when such measurements or calculations are available, in the implementation of this methodology.

The methodology of the present disclosure has also been demonstrated to improve system robustness by compensating for minor differences in system pressures encountered between different systems. As described previously, any component of a system that alters the pressure may impact the separation. As an example, there may be small amount of pressure drop in the tubing between the column outlet and the detector. If, due to contamination, that tubing became partially obstructed, this would result in an increase in pressure drop across that piece of tubing, and could alter the overall pressure profile for this separation, and hence may alter the retention and selectivity of the analytes. Compensating for this increased pressure due to tubing obstruction by maintaining the average pressure, either manually or in an automatic fashion, may maintain the chromatographic integrity of this separation yielding results similar to the separation prior to the tubing obstruction.

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

EXAMPLES

Example 1

This example demonstrates the efficient transfer of a carbon dioxide based chromatographic method between two analytical scale systems wherein the difference between the systems is the column particle size.

A sample mixture containing caffeine (1), carbamazepine (2), uracil (3), hydrocortisone (4), prednisolone (5) and sulfanilamide (6) was separated on an analytical scale carbon dioxide based chromatography instrument (ACQUITY® $UPC^2$, available at Waters Technologies Corporation (Milford, Mass.)) using a BEH 2-EP® column (2.1×150 mm, 1.7 μm particle size), available at Waters Technologies Corporation (Milford, Mass.). The separation was isocratic using a carbon dioxide mobile phase with 10% methanol modifier and performed at a flow rate of 1.4 mL/min and at 40° C. The separation was optimized using traditional means. The optimized separation, shown in FIG. 2A, has an ABPR setting of 1,500 psi. Pressure sensors were placed upstream and downstream of the column. The average column pressure calculated from the two pressure sensors was 3,694 psi.

The separation procedure was then transferred to a second system identical to the first system with the exception of the column stationary phase particle size. The second system consisted of an analytical scale carbon dioxide based chromatography instrument (ACQUITY® $UPC^2$, available at Waters Technologies Corporation (Milford, Mass.)) using a BEH 2-EP® column (2.1×150 mm, 5 μm particle size), available at Waters Technologies Corporation (Milford, Mass.). The particle size of the second column was 5 μm, as opposed to 1.7 μm. All other system conditions were the same. The separation was isocratic using a carbon dioxide mobile phase with 10% methanol modifier and performed at a flow rate of 1.4 mL/min and at 40° C. Initially, the second separation was performed at the ABPR setting of the first system, i.e., 1,500 psi. The ABPR sets the system outlet pressure to maintain the mobile phase density. The same ABPR setting is used in some embodiments to initially duplicate the pressure regime of the first separation. This resulted in an average column pressure in the second system of 1,752 psi. The resulting chromatograph, shown in FIG. 2B, was sub-optimal. The retention factor for sulfanilamide, for example, increased from 10.3 to 15.7.

The pressure settings on the second system were incrementally adjusted so that the average column pressure for the second system (i.e., 3,693 psi) substantially matched the average column pressure of the first system (i.e., 3,694 psi). The final chromatograph, shown in FIG. 2C, showed a separation similar to the optimized separation on the first system. The retention factors for sulfanilamide, for example, are comparable (10.3 vs. 9.2)—not shown. FIGS. 2D-2G shows a comparison of mobile phase density simulations across the column length with and without average density matching.

The use of the larger particle size, 5 μm, without adjustment of the ABPR, resulted in a lower pressure profile for the separation yielding different selectivity and retention factors relative to the initial 1.7 μm separation. The selectivity change is dramatic enough to result in a coelution of peaks 2 and 3, see FIG. 2D, 5 μm separation results. FIG. 2E provides a density simulation across the column length for the two separations. As can be seen in FIG. 2E, the density profile is unmatched. When the ABPR is adjusted to provide the similar separation pressure profile as the 1.7 μm separation, the resolution of peaks 2 and 3 is recovered, with similar selectivity and retention factors to the initial separation on the 1.7 μm particle, see FIG. 2F providing the chromatography results (peaks 2 and 3 are no longer coelued) and FIG. 2G, showing matched density simulations. While the efficiency (N, number of theoretical plates) of the 5 μm separation is lower relative to the 1.7 μm separation (i.e., 6,561 vs. 19,809), this is to be expected for the larger particle size, which is similar to what would be observed under conventional LC conditions.

The simulations of density profiles shown in FIG. 2E and FIG. 2G were created based on the assumption that variation of pressure profile along the column is linear. This assumption is valid in almost the entire pressure-temperature plane, which was shown recently through rigorous simulation studies. (Tarafder et al., Journal of Chromatography A, 1238 (2012) 132-145 and Tarafder et al., Journal of Chromatography A, 1258 (2012) 136-151.) The densities of the $CO_2$/methanol mixtures were calculated using the REFPROP software from NIST. (Lemmon et al., National Institute of Standards and Technology, Standard Reference Data Program, Gaithersburg 9.1.) REFPROP calculates the neat $CO_2$ density following the Span and Wagner equation of state (EOS) and calculates the $CO_2$/MeOH mixture density using the Kunz and Wagner model. (Span et al, J. Phys. Chem. Ref. Data, 25(6):1509-1596, 1996; Kunz et al, J. Chem. Eng. Data 57(11):3032-3091, 2012.) The errors in the estimation of $CO_2$ density using Span and Wagner EOS range between 0.03 and 0.05% for $CO_2$ pressures up to 4,350 psi and temperatures up to 250° C. For methanol, the errors on the values provided by REFPROP are 1% for the density of the dilute gas and between 0.6 and 3% for that of the liquid at pressures up to 14,500 psi and temperatures between 0 and 70° C. No specific information regarding the estimation of errors made by the Kunz and Wagner mixing rule is available.

From the density profile simulations shown in FIG. 2E, it is clear that the analytes experience different average mobile phase density profiles during the separations. Using density calculations, shown in FIG. 2G, appropriate chromatographic conditions can be determined such that the analytes experience nearly the same average mobile phase density. This is confirmed by the chromatography results shown in FIG. 2F. FIG. 2F demonstrates the chromatographic integrity between the two different separations, as there is similar retention and resolution. Minor chromatographic differences between the results shown for the 1.7 micron separation versus the 5 micron separation shown in FIG. 2F can be attributed to the approach of using density profile averages instead of exact density profiles. As would be observed in an LC scaling experiment, larger particle size stationary phases yield lower efficiency separations. With efficiency inversely proportional to particle size, the expected efficiency of a 5 μm particle would only be about 34% that of a 1.7 μm particle (1.7 μm/5 μm). This is supported by the observed efficiency for the sulfanilamide peak, with efficiencies (NUSP) of 19,809 and 6,561 plates for the 1.7 μm and 5 μm particle sizes, respectively.

Example 2

This example demonstrates the efficient transfer of a carbon dioxide based chromatographic method between two analytical scale systems wherein the difference between the systems is the column particle size and flow rate.

The same sample mixture used in Example 1 was used. The first separation used the same procedure and separation system as used in Example 1. The first separation on the first system is shown in FIG. 3A. The particle size was 1.7 μm. The flow rate was 1.4 mL/min. The ABPR was set to 1,500 psi. The average column pressure calculated from the two pressure sensors was 3,694 psi.

The separation procedure was then transferred to a second system identical to the first system with two exceptions, the column particle size and flow rate. The second system included a column having a 5 μm particle size and a flow rate of 0.48 mL/min. The flow rate was scaled to account for the difference in particle size to maintain the optimum linear velocity by adjusting the flow rate based on the ratio of the particle sizes:

flow rate×$(d_{p1}/d_{p2})$=1.4 mL/min×(1.7 μm/5 μm)=0.48 mL/min

Initially, the second separation was performed at the ABPR setting of the first system, i.e., 1,500 psi. This resulted in an average column pressure in the second system of 1,572 psi. The resulting chromatograph, shown in FIG. 3B, was suboptimal. The retention factor (k') for sulfanilamide, for example, increased from 10.3 to 15.7.

The pressure settings on the second system were incrementally adjusted so that the average column pressure for the second system (i.e., 3,688 psi) substantially matched the average column pressure of the first system (i.e., 3,694 psi). The final chromatograph, shown in FIG. 3C, showed a separation similar to the optimized separation on the first system. The retention factors for sulfanilamide, for example, are comparable (10.3 vs. 9.2).

Example 3

This example demonstrates the efficient transfer of a carbon dioxide based chromatographic method between three analytical scale systems wherein the difference between the systems is the flow rate.

At flow rates faster than the optimum linear velocity, chromatographic efficiency decreases, similar to what is observed for LC applications. But often times this decrease in efficiency is an acceptable trade-off for the decrease in run time. However, for SFC/$CO_2$-based chromatography applications, any alteration in flow rate will alter the density profile of the separation, potentially altering the resulting chromatography. By matching the density profile averages, these effects can be mitigated.

In this example the same sample mixture used in Example 1 was used. The mixture was separated on an analytical scale carbon dioxide based chromatography instrument (ACQUITY® UPC$^2$, available at Waters Technologies Corporation (Milford, Mass.)) using a BEH 2-EP column (2.1×150 mm, 5 μm particle size), available at Waters Technologies Corporation (Milford, Mass.). The separation was isocratic using a carbon dioxide mobile phase with 10% methanol modifier and performed at a flow rate of 0.48 mL/min and at 40° C. The separation was optimized using traditional means. The optimized separation, shown in FIG. 4A, has an ABPR setting of 3,600 psi. The average column pressure calculated from the two pressure sensors was 3,688 psi.

The flow rate and ABPR were adjusted to evaluate the effect of different flow rates and ABPR settings for different separation procedures when the average column pressures is held constant. The flow rate was adjusted to 1.4 mL/min and the ABPR adjusted to 3,390 psi to achieve a substantially similar average column pressure (i.e., 3,693 psi) as the first system (3,688 psi). The resulting chromatograph, shown in FIG. 4B, showed a separation similar to the optimized separation on the first system. The retention factors (k') for sulfanilamide, for example, are comparable (10.3 vs. 9.2).

In another separation, the flow rate was adjusted to 4.0 mL/min and the ABPR adjusted to 2,322 psi to achieve a substantially similar average column pressure (i.e., 3,694 psi) as the first system (3,688 psi). The resulting chromatograph, shown in FIG. 4C, showed a separation similar to the optimized separation on the first system and on the second system. The retention factors for sulfanilamide, for example, are comparable (10.3 vs. 9.2 vs. 8.7). As is similarly observed for LC methods, a decrease in overall separation efficiency (N) is observed at flow rates faster than the optimum linear velocity (~0.48 mL/min for a 5 μm particle size in this current configuration). That is, as the flow rate is increased to 1.4 and 4.0 mL/min, the decrease in chromatographic efficiency is obvious, but expected due to the predominant mass transfer term of the van Deemter equation at the fast flow rates.

Figure 4D:
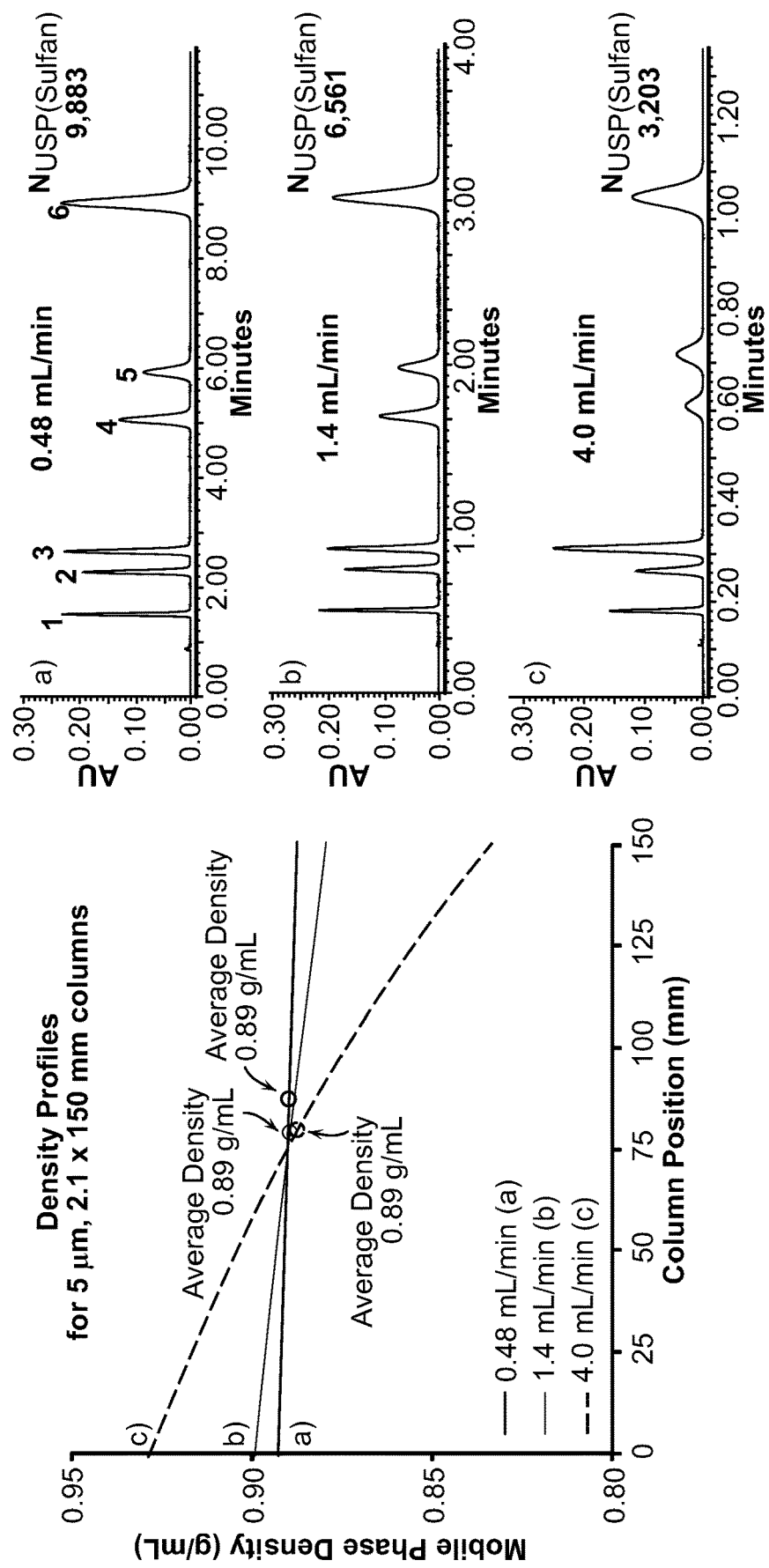
FIG. 4D shows a comparison of mobile phase density simulations across the column length with average density matching for the separations shown in FIGS. 4A-4C.

FIG. 4D shows a comparison of mobile phase density simulations across the column length with average density matching. Line a corresponds to the conditions used in the separation shown in FIG. 4A; line b corresponds to the conditions used in the separation shown in FIG. 4B; and line c corresponds to the conditions used in the separation show in FIG. 4C. This example demonstrates the utility of this approach to maintain chromatographic integrity of a separation in the presence of configuration/method alterations that have a direct impact on the density profile of a separation. By using conditions which result in a substantially similar average column pressure/density profile across the column, one can efficiently and reliably transfer between different system configurations.

Example 4

This example demonstrates the efficient transfer of a carbon dioxide based chromatographic method developed using an analytical scale instrument to a preparative SFC instrument.

The same sample mixture used in Example 1 was used. The initial separation used the same procedure and separation system as used in Example 1. The optimized separation, shown in FIG. 5A, has an ABPR setting of 1,500 psi. The average column pressure calculated from the two pressure sensors was 3,694 psi.

The separation procedure was then transferred to a second system identical to the first system with two exceptions, the column particle size and flow rate. The second system included a column having a 5 μm particle size and a flow rate of 0.48 mL/min. (See Example 3, in particular the embodiment corresponding to the results shown in FIG. 3C). Those results are repeated here as FIG. 5B. A comparison of the retention factors (k') for sulfanilamide, for example, between the configurations shown between FIG. 5A and FIG. 5B illustrates the integrity of the transfer (10.3 vs. 9.2).

The separation procedure was then transferred a third system, i.e., a preparative scale carbon dioxide based chromatography instrument (Prep100 SFC, available at Waters Technologies Corporation (Milford, Mass.)). The third system used the same column chemistry (BEH 2-EP) as the previous separations but in a larger configuration (19×150 mm, 5 μm particle size), available at Waters Technologies Corporation (Milford, Mass.). The separation was isocratic using a carbon dioxide mobile phase with 6% methanol modifier and performed at a flow rate of 80 g/min and 40° C. While most analytical instrumentation measures flow volumetrically (mL/min), many preparative SFC instruments measure flow rate in mass with units of g/min. At the densities used for preparative chromatography, 80 g/min correlates to approximately 83 mL/min. The injection volume used for the preparative separation, 240 μL, was scaled from the analytical separation (2 μL injection volume) by the ratio of the column volumes for the two systems:

$$2 \text{ μL injection} \times (\text{Volume2}_{19 \times 150}/\text{Volume1}_{3.0 \times 50}) = 240 \text{ μL injection}$$

The pressure settings on the third system were incrementally adjusted so that the average column pressure for the third system (i.e., 3,678 psi) substantially matched the average column pressure of the first system (i.e., 3,694 psi). The chromatograph for the third system, shown in FIG. 5C, showed a separation similar to the optimized separation on the first system and the second system. The retention factors for sulfanilamide, for example, are comparable (10.3 vs. 9.2 vs. 7.9).

Figure 5D:
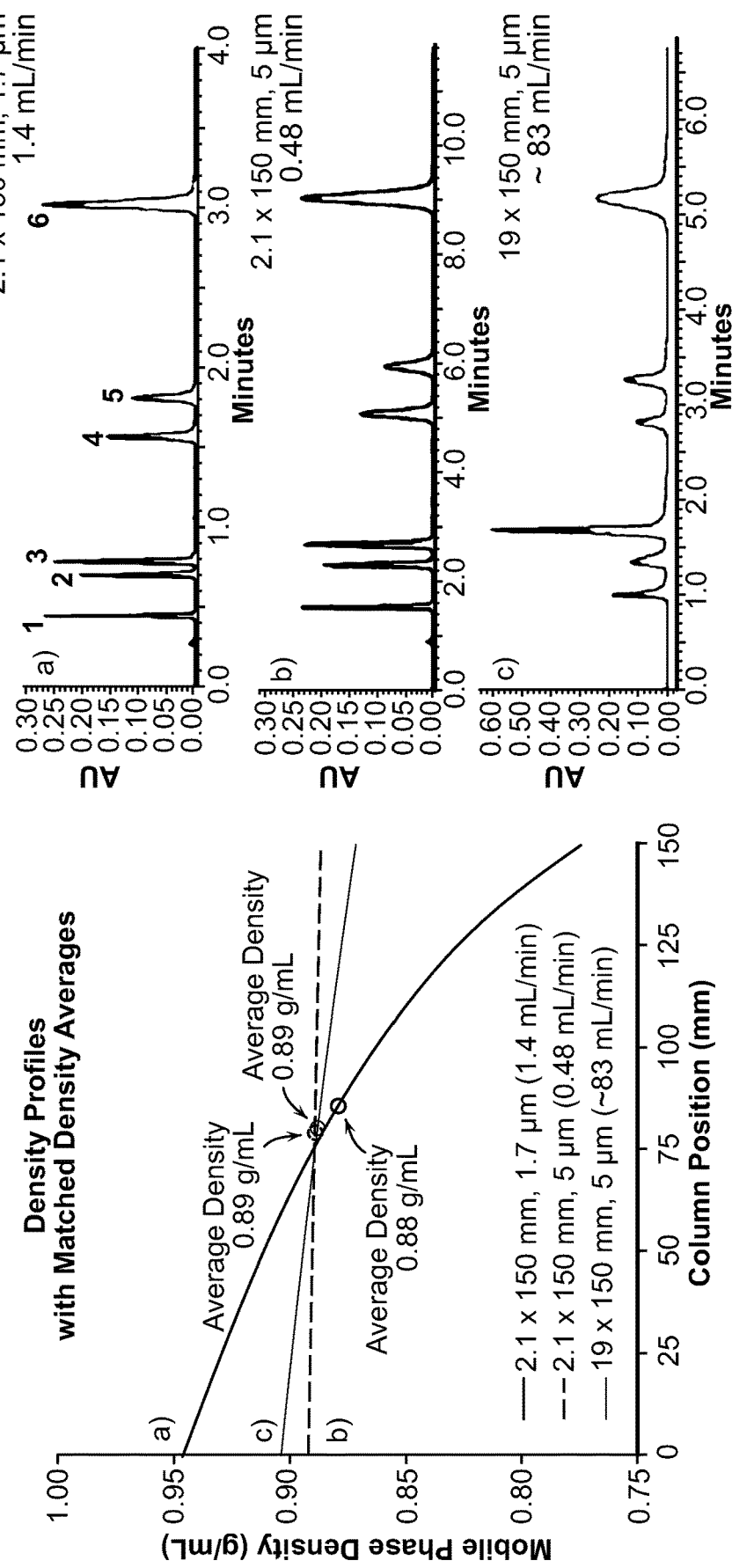
FIG. 5D and FIG. 6C provide simulation density profiles for their corresponding separations.

FIG. 5D shows a comparison of mobile phase density profiles across the column length with average density matching. Line a corresponds to the conditions used in the separation shown in FIG. 5A; line b corresponds to the conditions used in the separation shown in FIG. 5B; and line c corresponds to the conditions used in the separation show in FIG. 5C. This example demonstrates the utility of this approach to maintain chromatographic integrity of a separation in the presence of configuration/method alterations that have a direct impact on the density profile of a separation. By using conditions which result in a substantially similar average column pressure/density profile across the column, one can efficiently and reliably transfer between different system configurations.

Example 5

This example demonstrates the efficient transfer of a carbon dioxide based chromatographic method developed using an analytical scale instrument to a preparative SFC instrument. In particular, in this example the scaling strategy maintains the ratio of column length to particle size (L/dp).

Figure 6A:
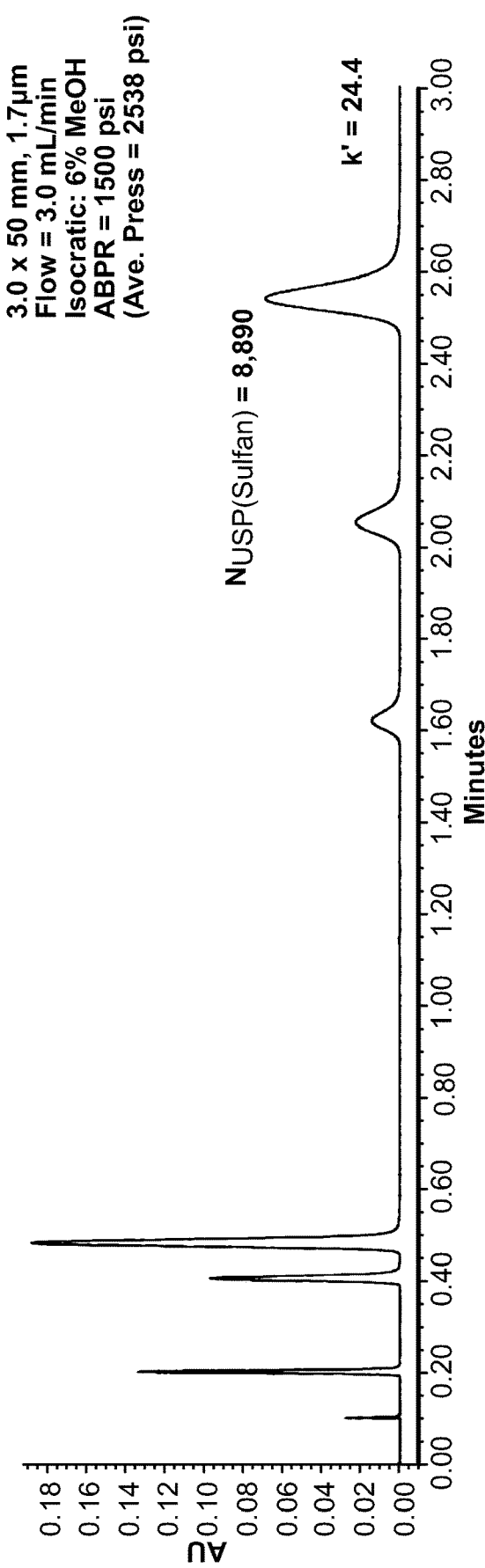

The same sample mixture used in Example 1 was used. The first system was an analytical scale carbon dioxide based chromatography instrument (ACQUITY® UPC$^2$, available at Waters Technologies Corporation (Milford, Mass.)) using a BEH 2-EP column (3.0×50 mm, 1.7 μm particle size), available at Waters Technologies Corporation (Milford, Mass.). The separation was isocratic using a carbon dioxide mobile phase with 6% methanol modifier and performed at a flow rate of 3.0 mL/min and 40° C. The injection volume was 1 μL. The separation was optimized using traditional means. Pressure sensors were placed upstream and downstream of the column. The optimized separation, shown in FIG. 6A, has an ABPR setting of 1,500 psi and a system pressure upstream of the column of 3,576 psi. The average column pressure calculated from the two pressure sensors was 2,538 psi.

The separation procedure was then transferred to a second system, i.e., a preparative scale carbon dioxide based chromatography instrument (Prep100 SFC, available at Waters Technologies Corporation (Milford, Mass.)). As is common for the transfer of LC methods, the ratio of the column length to the particle size ($L/d_p$) was maintained using the same column chemistry, BEH 2-EP, for the second system (3.0×50 mm, 1.7 μm column scaled to 19×100 mm, 5 μm particle size column), available at Waters Technologies Corporation (Milford, Mass.).

Figure 6B:
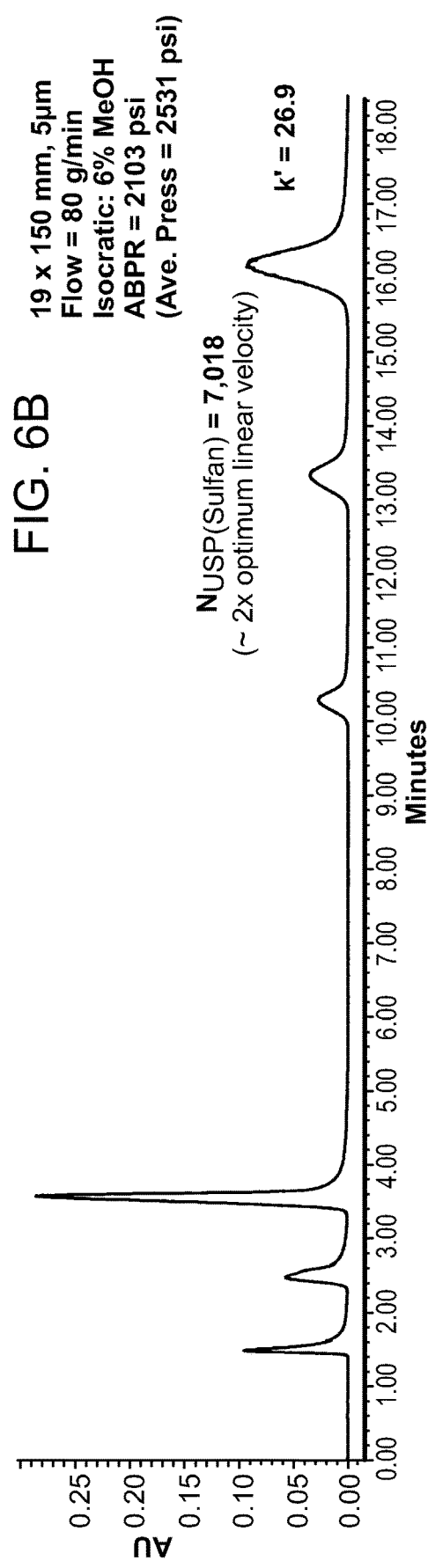

The separation was isocratic using a carbon dioxide mobile phase with 6% methanol modifier and performed at a flow rate of 80 g/min and 40° C. As in the previous example, the injection volume for the preparative separation was scaled to 240 μL. The pressure settings on the second system were incrementally adjusted so that the average column pressure for the second system (i.e., 2,531 psi) substantially matched the average column pressure of the first system (i.e., 2,538 psi). The chromatograph for the second system, shown in FIG. 6B, showed a separation similar to the optimized separation on the first system. The retention factors for sulfanilamide, for example, are comparable (24.4 vs. 26.9).

For method transfer from analytical to preparative conditions, the ratio of column length to particle size for the two columns ($L/d_p$) was maintained, resulting in similar selectivity and retention factors after adjustment of the ABPR to maintain the same average pressure profile for the separation. It is not necessary, however, to match the column length/particle size ratio for the transfer of methods. Maintenance of this ratio yields the same efficiency between separations. In the current example, a 100 mm column could have been used with fairly good success, although with less efficiency than the original separation. The efficiency difference that is observed can be attributed, in part, to the difference in particle size and the faster linear velocity used for the preparative system relative to the analytical separation. This ability enables the rapid screening of methods on the faster analytical scale, with the direct transfer of the final method to preparative chromatography, resulting in significant savings in time and mobile phases.

Figure 6C:
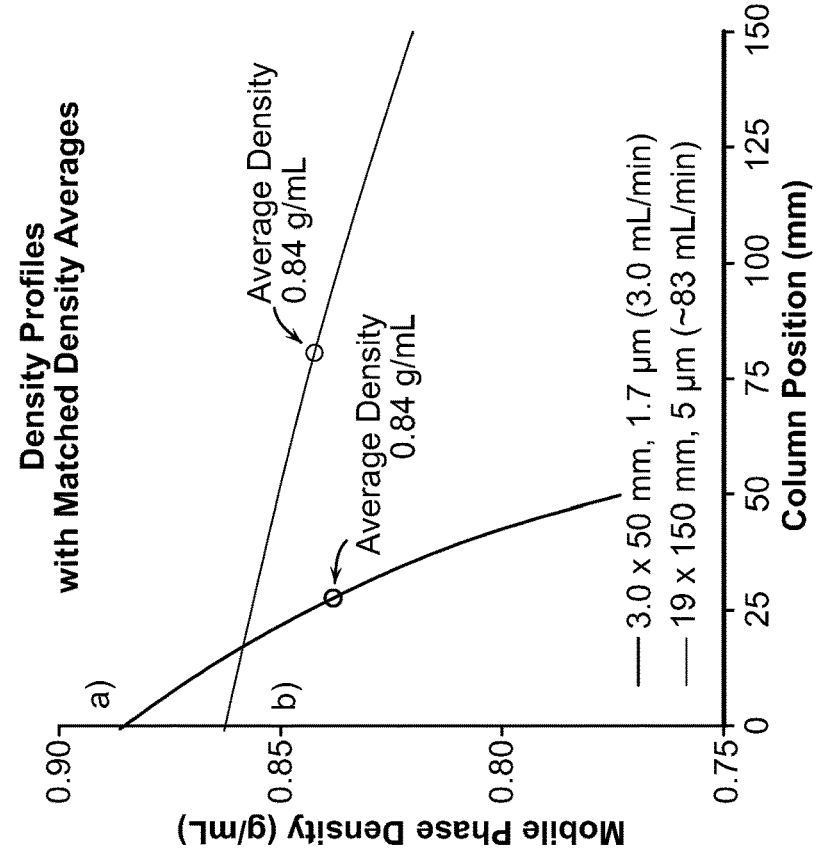

A simulation of the density profiles for the separations of the first and second systems (results shown in FIGS. 6A and 6B) is provided in FIG. 6C illustrating matched density averages results.

Example 6

This example demonstrates the effect of injection volume and sample concentration on the separation performance of a carbon dioxide based chromatographic method at a constant average column pressure.

The same sample mixture used in Example 1 is used. The mixture was separated on an analytical scale carbon dioxide based chromatography instrument (ACQUITY® UPC$^2$, available at Waters Technologies Corporation (Milford, Mass.)) using a BEH 2-EP column (3.0×50 mm, 1.7 μm particle size), available at Waters Technologies Corporation (Milford, Mass.). The separation was isocratic using a carbon dioxide mobile phase with 6% methanol modifier and performed at a flow rate of 3.0 mL/min and at 40° C. The injection volume was 1 μL. The concentration of each analyte in the mixture was 0.2 mg/mL. The separation was optimized using traditional means. The optimized separation, shown in FIG. 7C, has an ABPR setting of 1,500 psi. Pressure sensors were placed upstream and downstream of the column. The average column pressure calculated from the two pressure sensors was 2,538 psi.

The separation was repeated using a different separation procedure. The concentration was adjusted to 3.75 mg/mL. The average column pressure remained constant at 2,538 psi. The resulting separation, shown in FIG. 7B, showed a similar separation. The separation was also repeated using another separation procedure. The injection volume was adjusted to 2 μL and the sample concentration was adjusted to 3.75 mg/mL each. The average column pressure remained constant at 2,538 psi. The resulting separation, shown in FIG. 7A, showed a similar separation. Changes in injection volume and sample concentration appear to have little effect on the separation performance of an SFC method at a constant average column pressure.

Example 7

This example demonstrates the calculation of the average column pressure for a gradient separation for a carbon dioxide based chromatographic separation.

The same sample mixture used in Example 1 is used. The mixture was separated on an analytical scale carbon dioxide based chromatography instrument (ACQUITY® UPC$^2$, available at Waters Technologies Corporation (Milford, Mass.)) using a BEH 2-EP column (3.0×50 mm, 1.7 μm particle size), available at Waters Technologies Corporation (Milford, Mass.). The separation used a carbon dioxide mobile phase with 2-10% methanol modifier adjusted under gradient conditions over 3 minutes. The flow rate was 3.0 mL/min. The separation was optimized using traditional means. The optimized separation, shown in FIG. 8A, has an ABPR setting of 1,500 psi. Pressure sensors were placed upstream and downstream of the column. The system pressure readings are shown in FIG. 8B. At the initial gradient conditions, i.e., 2% modifier, the system pressure upstream of the column was 3,529 psi and the system pressure downstream of the column was 1,500 psi. The average column pressure was calculated at the initial gradient conditions as 2,514 psi, which is the average of 3,529 psi and 1,500 psi. At the final gradient conditions, i.e., 10% modifier, the system pressure upstream of the column was 3,678 psi and the system pressure downstream of the column was 1,500 psi. The average column pressure was calculated at the final gradient conditions as 2,589 psi, which is the average of 3,678 psi and 1,500 psi. Thereafter, the average column pressure for the gradient separation was calculated to be 2,551 psi, which is the average of 2,514 psi and 2,589 psi.

Example 8

This example demonstrates the effect of injection volume and sample concentration on the gradient separation performance of a carbon dioxide based chromatographic method at a constant average column pressure.

The same sample mixture used in Example 1 is used. The mixture was separated on an analytical scale carbon dioxide based chromatography instrument (ACQUITY® UPC$^2$, available at Waters Technologies Corporation (Milford, Mass.)) using a BEH 2-EP column (3.0×50 mm, 1.7 μm particle size), available at Waters Technologies Corporation (Milford, Mass.). The separation used a carbon dioxide mobile phase with 2-10% methanol modifier adjusted under gradient conditions over 3 minutes. The flow rate was 3.0 mL/min. The injection volume was 1 μL. The concentration of the analytes in the mixture was 0.2 mg/mL each. The separation was optimized using traditional means. The optimized separation, shown in FIG. 9C, has an ABPR setting of 1,500 psi. Pressure sensors were placed upstream and downstream of the column.

The separation was repeated using a different separation procedure. The concentration was adjusted to 3.75 mg/mL. The average column pressure remained constant. The resulting separation, shown in FIG. 9B, showed a similar separation. The separation was also repeated using another separation procedure. The injection volume was adjusted to 2 μL and the sample concentration was adjusted to 3.75 mg/mL each. The resulting separation, shown in FIG. 9A, showed a similar separation. Changes in injection volume and sample concentration appear to have little effect on the separation performance of a gradient SFC method at a constant average column pressure.

Example 9

This example demonstrates the efficient transfer of a gradient carbon dioxide based chromatographic method developed using an analytical scale instrument to a preparative carbon dioxide based chromatographic instrument.

The same sample mixture used in Example 1 was used. The initial separation used the same procedure and separation system as used in Example 7. The optimized separation, shown in FIG. 10A, has an ABPR setting of 1,500 psi. The average column pressure calculated from the two pressure sensors was 2,551 psi.

The separation procedure was then transferred to a second system, i.e., a preparative scale carbon dioxide based chromatography instrument (Prep100 SFC, available at Waters Technologies Corporation (Milford, Mass.)). The second system used the same column chemistry (BEH 2-EP) as the previous separations but in a larger configuration (19×150 mm, 5 μm particle size), available at Waters Technologies Corporation (Milford, Mass.). The separation used a carbon dioxide mobile phase with a 2-10% methanol modifier gradient over 13.5 minutes. The gradient time of 13.5 minutes was scaled from the original conditions (3 minutes at 3 mL/min) to maintain the same number of column volumes of mobile phase during the gradient at a flow rate of approximately 83 mL/min. The injection volume was 240

µL. The pressure settings on the second system were incrementally adjusted so that the average column pressure for the second system (i.e., 2,325 psi) roughly matched the average column pressure of the first system (i.e., 2,551 psi). The chromatograph for the second system, shown in FIG. 10B, showed a separation similar to the optimized separation on the first system. The retention factors for sulfanilamide, for example, are comparable (24.0 vs. 16.6). The discrepancy in retention factors observed here are primarily due to differences in overall system volume between the two systems that were not corrected for in these evaluations. For example, no accommodations for differences in system dwell volumes were considered.

Figure 10C:
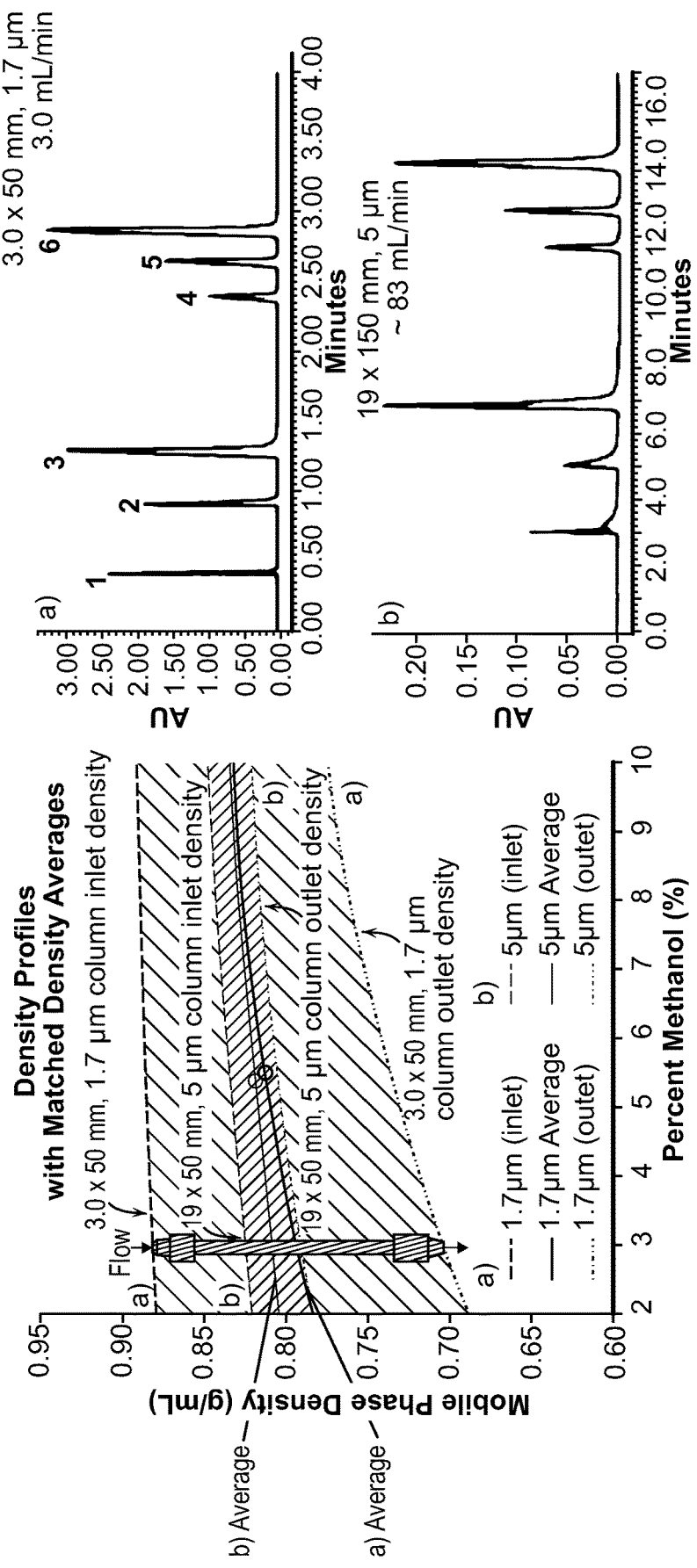
FIG. 10C shows simulation of density profiles for first and second gradient systems used in Example 9.

For previous examples, attention and focus was on matching density profiles across the column. For gradient examples, one needs to consider the changing density profile as the modifier concentration transitions to higher values. See for example, FIG. 10C showing the simulation of density profiles for the first and second gradient systems used in this example.

Example 10

This example demonstrates the effect of flow rate on k' for systems maintaining a constant system pressure.

The same sample mixture and separation system described in Example 1 was used. Separations were performed using both a low back pressure column (about 300 psi delta) and a high back pressure column (about 2,000 psi delta). The result for each column was the same.

Figure 11:
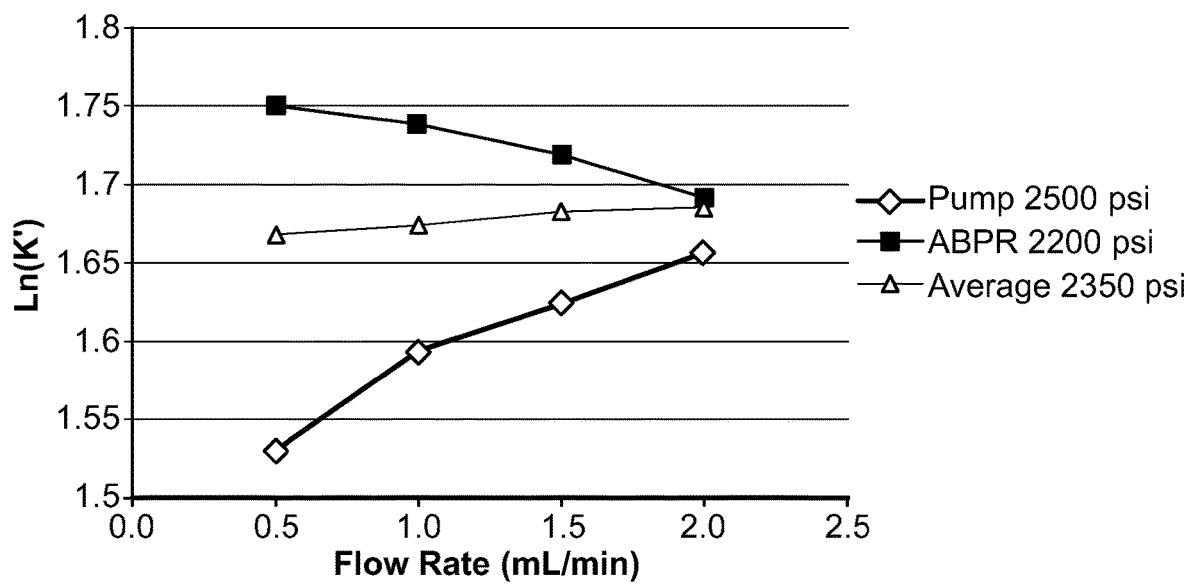
FIG. 11 and FIG. 12 together show a comparison of k' values for two different carbon dioxide based chromatographic systems under different pressure conditions for three different pressure scenarios.
Figure 12:
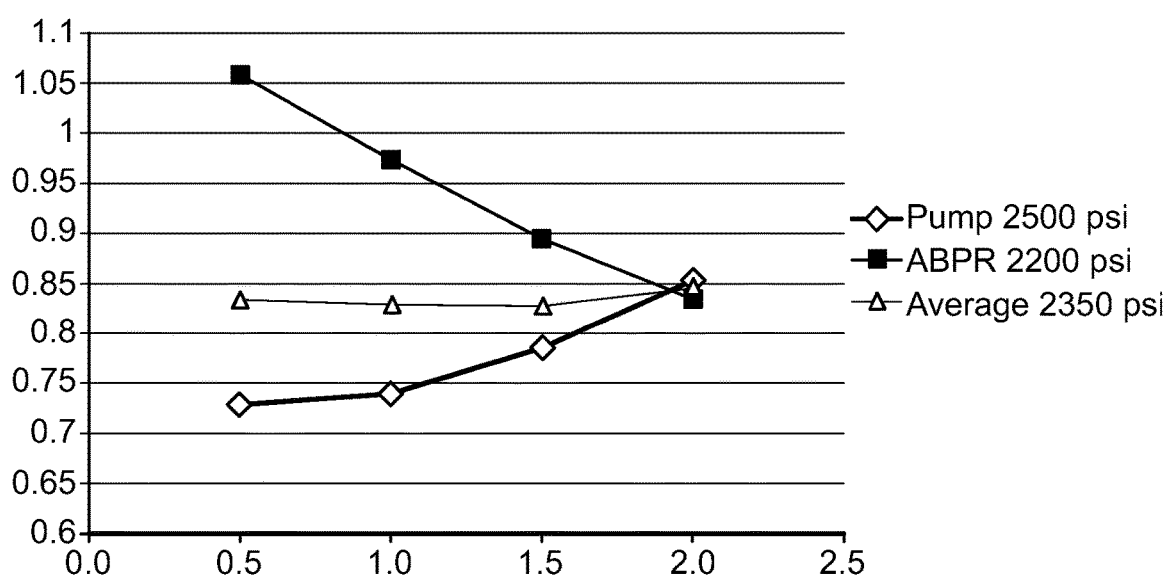

For each system, the separation was performed for three different pressure scenarios. The first scenario maintained a constant pressure at the pump of about 2,500 psi as the flow rate was varied from 0.5 mL/min to 2 mL/min. To maintain the system pressure at a constant value, the ABPR pressure setting was decreased to compensate for the higher pressures at the higher flow rates. The second scenario maintained a constant pressure at the ABPR of about 2,200 psi as the flow rate was varied from 0.5 mL/min to 2 mL/min. Under these conditions, the system pressure increased as a consequence of the increasing flow rate. The third scenario maintained a constant average pressure across the column of about 2,350 psi as the flow rate was varied from 0.5 mL/min to 2 mL/min. The results are shown in FIGS. 11 and 12. FIG. 11 provides the results for the first system, the low back pressure system (about 300 psi delta), whereas FIG. 12 provides the results for the second system, the high back pressure system (about 2,000 psi delta). The k' value for peak 3 (uracil) is representative of performance for the other analytes. As shown, by maintaining a constant average pressure across the column the k' values remain almost constant. The variation in k' observed may be caused by the pressure drop through the tubing not being accounted for in the average pressure. By maintaining a constant pressure at only one point in the system, e.g., pump or ABPR, the system pressure for the first two settings does not remain constant.

Maintaining a constant k' for each analyte over various flow rates also allows for control over the separation time. A constant k' for each analyte keeps the analytes from moving relative to each other and maintains the elution order. Separations may be performed more quickly. The transfer of methods between two system may also be faster.

Example 11

This example demonstrates the effect on analyte retention in response to small changes in system pressure. These small changes in system pressure can be a result of system to system variation, they can be introduced intentionally, by changes in tubing i.d or length, or they can be unintentional and often times not obvious. This could be the result of a contaminant lodged in the system which causes a small restriction of the flow path resulting in small increases in operating pressure. It could also be the result of a very small leak causing a decrease in the overall operating pressure. Often times these issues are difficult to identify and can result in chromatographic inconsistencies from system to system or over time.

Figure 13:
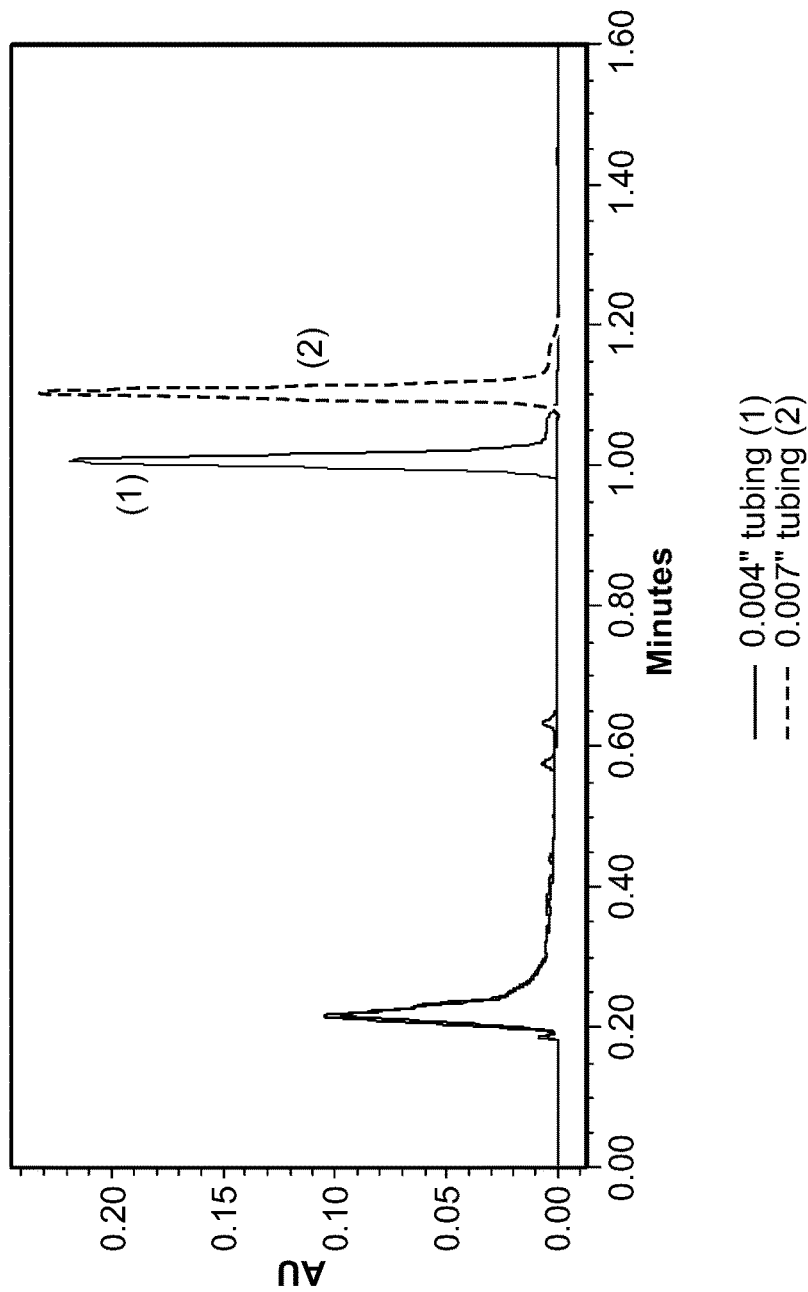
FIG. 13 and FIG. 14 together show the effect on analyte retention in response to small changes in system pressure, and the correlation of those effects by matching the pressure profiles for the separation.
Figure 14:
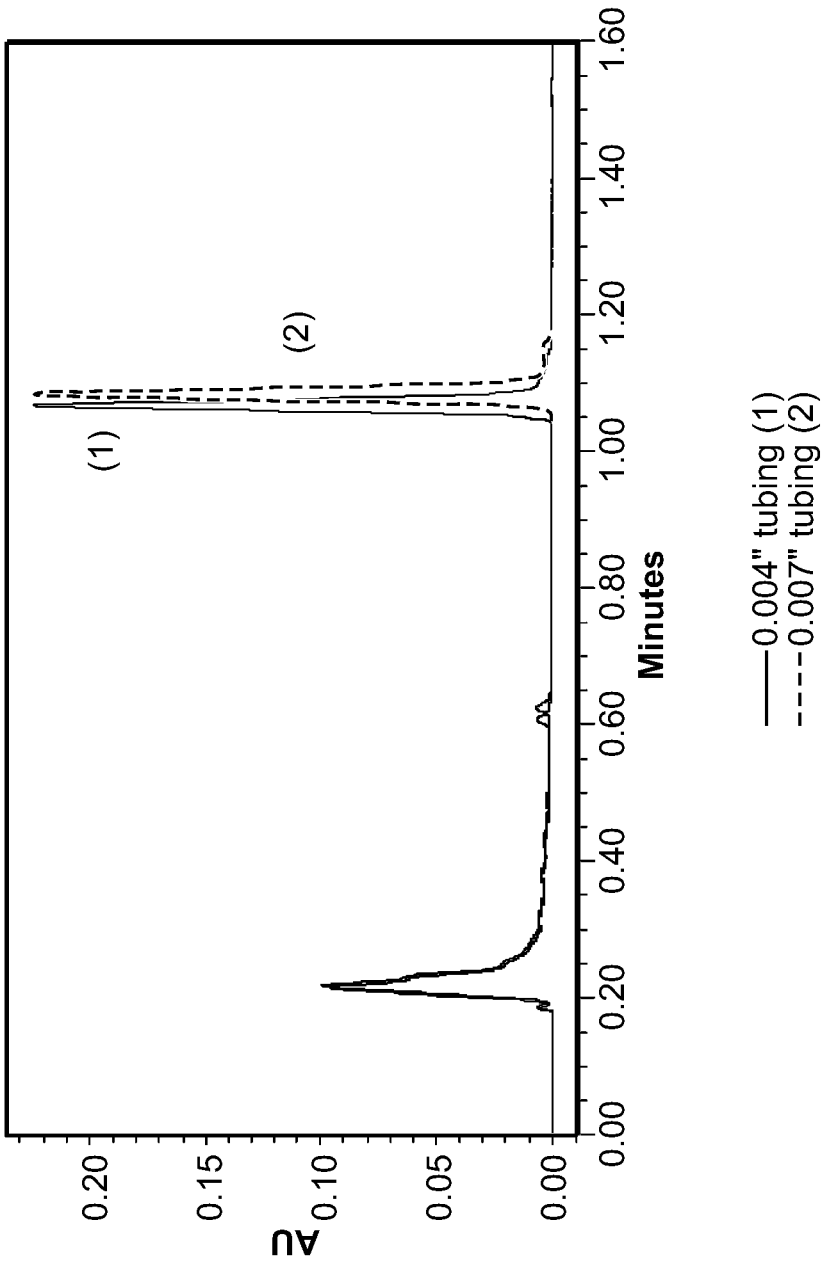

Using the current methodology of matching average density or average column pressure profiles can mitigate the changes in retention due to these small changes in system pressure. FIGS. 13 and 14 demonstrate this concept for a change in system tubing. The column outlet tubing, with a 0.007" ID, was substituted with a new piece of tubing with a 0.004" ID. The reduction in tubing ID resulted in a 400 psi increase in overall system pressure. While for traditional chromatography, changes in solvent density are negligible, in systems utilizing CO2, are profoundly affected by pressure discrepancies, such as the one created by such a tubing replacement as described in this example. The impact of this pressure increase can be seen in the FIG. 13 in which the peak collected at the higher pressure, with the smaller ID tubing, is shifted to lower k' values. This shift in retention can be mitigate by maintaining the average column pressure, shown in FIG. 14, resulting in peaks with nearly identical retention factors. As a result, the methods used in a system having 0.004" tubing can be quickly transferred to a system using instrumentation having 0.007" tubing.

From the above discussion, one skilled in the art can ascertain the invention, and without departing from the spirit and scope thereof, can make various changes and modifications of the invention to adapt it to various uses and conditions.

What is claimed is:

1. A method of transferring a carbon dioxide based separation procedure between at least two different carbon dioxide based separation systems comprising:
    performing a first carbon dioxide based separation on a first carbon dioxide separation system, the first carbon dioxide based separation system including a first separation column, a first detector for detecting target analytes, and a first back pressure regulator;
    determining an average mobile phase density or average column pressure for the first carbon dioxide based separation; and
    performing a second carbon dioxide based separation on a second carbon dioxide based separation system substantially at the average mobile phase density or average column pressure determined for the first carbon dioxide based separation, the second carbon dioxide based separation system including a second separation column, a second detector for detecting target analytes, and a second back pressure regulator, wherein the first carbon dioxide separation system and the second carbon dioxide separation system have distinct system configurations.

2. The method of claim 1, wherein the first separation column and the second separation column have stationary phases formed from the same material.

3. The method of claim 1, wherein the first separation column has a different particle size from the second separation column.

4. The method of claim 1, wherein the first separation column has at least one different column dimension from the second separation column.

5. The method of claim 1, wherein the second carbon dioxide based separation performed on the second carbon dioxide based separation system exhibits substantially a same retention factor (k') or selectivity as the first carbon dioxide based separation performed on the first carbon dioxide based separation system.

6. The method of claim 1, wherein the average mobile phase density or average column pressure is the average mobile phase density or pressure calculated from (i) an average system mobile phase density or system pressure measured at a head of the first separation column and (ii) an output mobile phase density or pressure measured at a base of the first separation column.

\* \* \* \* \*